US012675124B2

(12) United States Patent
Lee

(10) Patent No.: US 12,675,124 B2
(45) Date of Patent: Jul. 7, 2026

(54) INTELLIGENT TEMPERATURE CONTROL METHOD AND SYSTEM OF HEATING AND/OR COOLING APPARATUS

(71) Applicant: Saebom Lee, Gyeonggi-do (KR)

(72) Inventor: Saebom Lee, Gyeonggi-do (KR)

( * ) Notice: Subject to any disclaimer, the term of this patent is extended or adjusted under 35 U.S.C. 154(b) by 105 days.

(21) Appl. No.: 18/741,789

(22) Filed: Jun. 13, 2024

(65) Prior Publication Data

US 2024/0419198 A1 Dec. 19, 2024

(30) Foreign Application Priority Data

Jun. 16, 2023 (KR) ........................ 10-2023-0077458
Aug. 23, 2023 (KR) ........................ 10-2023-0110763

(51) Int. Cl.
*G05D 23/19* (2006.01)
(52) U.S. Cl.
CPC ................................. *G05D 23/1902* (2013.01)
(58) Field of Classification Search
CPC .................................................. G05D 23/1902
See application file for complete search history.

(56) References Cited

U.S. PATENT DOCUMENTS

2017/0359857 A1 * 12/2017 Culbertson ........... F02D 41/222

FOREIGN PATENT DOCUMENTS

JP 2010258168 11/2010
KR 20210069398 6/2021

KR 20220053250 4/2022
KR 102420120 7/2022
WO WO-9843740 A2 * 10/1998 ............. H10N 10/13
WO WO-2009032087 A1 * 3/2009 ............. G05D 23/22

OTHER PUBLICATIONS

Instrument, "PT100 Temperature Sensor (RTD Sensor)", submit with Machine English translation, May 31, 2021, https://blog.naver.com/newrains/222377613864.
Omega, "Thermocouple", submit with Machine English translation, retrieved on Oct. 28, 2025, https://kr.omega.com/prodinfo/thermocouples.html.
"Office Action of Korea Counterpart Application", issued on Jul. 31, 2025, with English translation thereof, pp. 1-23.

* cited by examiner

*Primary Examiner* — Jonathan Bradford
(74) *Attorney, Agent, or Firm* — JCIPRNET

(57) ABSTRACT

A temperature control system includes a thermal medium on which an object of which temperature is to be controlled is mounted, a resistant thermal actuator installed on the thermal medium and configured to perform heating and/or cooling, a power controller configured to supply controlled power to the resistant thermal actuator, a resistant main sensor configured to detect the temperature of the thermal medium, a resistance value measurement unit configured to detect characteristic resistance of at least one of the resistant thermal actuator and/or the resistant main sensor, and a feedback controller configured to calculate a measurement error or an error of the resistant thermal actuator and/or the resistant main sensor from the characteristic resistance, and based on the measurement error or the error, generate a power control signal compensated for the power controller.

18 Claims, 17 Drawing Sheets

FIG. 14

| ZONE 1 R | ZONE 2 R | ----------------------------- | ZONE N R |

INTELLIGENT TEMPERATURE CONTROL METHOD AND SYSTEM OF HEATING AND/OR COOLING APPARATUS

CROSS-REFERENCE TO RELATED APPLICATIONS

This application is based on and claims priority under 35 U.S.C. § 119 to Korean Patent Application Nos. 10-2023-0077458, filed on Jun. 16, 2023, and 10-2023-0110763, filed on Aug. 23, 2023, in the Korean Intellectual Property Office, the disclosures of which are incorporated by reference herein in their entirety.

BACKGROUND

1. Field

The disclosure relates to an intelligent temperature control method and system of a heating and/or cooling apparatus, and more particularly, to an intelligent temperature control method and system for a heating and/or cooling apparatus that requires high-precision temperature control.

2. Description of the Related Art

A heating and/or cooling temperature control system used to manufacture an electronic apparatus heats or cools an object of which temperature is to be controlled, to a target temperature by feedback control, and maintains the temperature within a given range.

During a semiconductor manufacturing process, a process of heating a semiconductor wafer and a process of cooling a wafer are carried out, and the heating and/or cooling temperature control system or a cooling temperature control system is applied to the semiconductor manufacturing process.

FIG. 1 is a block diagram showing a schematic configuration of a conventional temperature control system.

A temperature control system 10 includes: a thermal medium 11 that performs direct temperature control on an object of which temperature is to be controlled (hereinafter, referred to as a target object) in a liquid, gas, or solid state; one or more thermal actuators TA such as a heater that directly heats the thermal medium 11 or a heat absorber that absorbs heat from the thermal medium 11; a power controller 12 that supplies controlled electrical power to one or more thermal actuators $TA_1$ to $TA_n$; a thermal actuator power unit 13 that supplies AC or DC power to be supplied to a thermal actuator, to the power controller 12, and a feedback controller 14 that detects the temperature of the thermal medium 11 and provides temperature control information about the thermal medium 11 to the power controller 12.

The feedback controller 14 receives a temperature signal from one or more temperature sensors $TS_1$ to $TS_n$ respectively corresponding to the one or more thermal actuators $TA_1$ to $TA_n$ installed on the thermal medium 11, compares the temperature signal with a reference temperature to control, and transmits a control value for controlling supply power for the one or more thermal actuators TA. In FIG. 1, reference signs "TA" and "TS" respectively refer to thermal actuators and temperature sensors, and the subscripts 1 to n in each reference sign refer to their respective numbers.

The power controller 12 supplies supply power determined according to the control value transmitted from the feedback controller 14 for each of the one or more thermal actuators TA. The one or more thermal actuators TA supply heat to or absorb heat from a target object placed on the thermal medium 11, according to the amount or magnitude of supplied power.

As the target object, for example, the object of which temperature is to be controlled, a cooling target object or a heating target object, such as a wafer for manufacturing a semiconductor, is heated or cooled on a heating plate or a cooling plate, which is a thermal medium for heating or cooling.

As described above, a thermal actuator (e.g., thermal source), such as a heater that directly heats the thermal medium or a heat absorber that absorbs heat from the thermal medium, is installed on the thermal medium.

The thermal actuator includes, for example, a heating element formed by metallic alloy wire, such as nichrome wire, or various alloy pastes, and a thermal actuator for absorbing heat may include, for example, a cooling element such as a Peltier element, which determines the direction of heat transfer by current flow and is mainly used as a cooler. The heating element and the Peltier element are types of resistant elements, and in the disclosure, changes in their characteristic resistance are detected.

For example, a well-known PID control method as shown in FIG. 2 may be applied to the feedback controller 14. The PID control method is structured to measure an output value, for example, the temperature, of an object to be measured which is an object to be controlled, compare the output value with a preset reference value or a setpoint to calculate an error, and calculate a manipulated variable as a control value required for control by using a value of the error. As is well known, the standard PID controller is configured to calculate the control value by adding a proportional term (P), an integral term (I), and a derivative term (D).

The feedback controller 14, for example, detects a voltage corresponding to a resistance change due to temperature by passing a certain amount of current through a resistance temperature detector (RTD) temperature sensor, or detects a minute voltage corresponding to a detected temperature from a thermocouple (TC) temperature sensor, undergoes a preprocessing process such as amplification and A/D conversion of the minute voltage, and then calculates a control value by the method as described above. The control value outputs as a signal being sent to the power controller 12 to control a relay, a solid state relay (SSR), or a silicon controlled rectifier (SCR) provided within the power controller 12 which connects the controlled AC or DC electricity to the one or more thermal actuators TA. Through temperature monitoring, the temperature of the thermal medium 11 is fed back through the one or more temperature sensors $TS_1$ to $TS_n$, and this is repeatedly performed to increase the temperature and maintain same at a desired target temperature.

However, a closed-loop control method using a temperature signal fed back from the one or more temperature sensors $TS_1$ to $TS_n$ shows a tendency for temperature control to become inaccurate over time. This occurs due to aging of various components involved in feedback control, that is, changes in electrical characteristics due to age-related changes.

Components subject to age-related changes include a temperature sensor. In the temperature sensor, a TC element may be used, or an RTD element may be used for more precise temperature detection. The RTD element is an element whose resistance changes according to temperature changes, and the TC element is an element that generates induced voltage by using thermoelectromotive force.

Although such temperature sensors vary depending on the type, the temperature sensors are bound to experience age-related changes due to longtime use, for example, changes in internal resistance, and thus expansion of measurement errors and resulting feedback control errors may not be avoided.

A measurement error of a temperature sensor may cause a fatal process defect in a process that requires high-precision temperature control, for example, a semiconductor manufacturing process, resulting in enormous economic damage. In addition, not only aging of a temperature sensor but also changes in external power applied to a thermal actuator may cause the above problem.

In precise temperature control of an object of which temperature is to be controlled, important components include a voltage that is applied to a thermal actuator, internal resistance of a thermal actuator, and a temperature sensor that measures the temperature of a thermal medium.

As a problem with the current temperature control system, it is difficult to maintain process conditions that have been initially set in order to precisely and accurately increase and maintain the temperature of a thermal medium, due to the following three changes.

1) Change in resistance of a temperature sensor

2) Change in resistance of a thermal actuator

3) Change in voltage applied to a thermal actuator

A. Change in Resistance of a Temperature Sensor

RTD elements have excellent linearity, enabling precise temperature detection. However, over time, there is a tendency for the internal resistance to gradually increase depending on a process temperature, compared to an initial state, and this becomes more noticeable at high temperatures and with longtime use. When the resistance increases abnormally, a feedback controller determines that the temperature of a thermal medium is increasing, and accordingly, lowers the temperature of an object to be heated or to be cooled, which is a target object, to a target value or less.

For example, the resistance of an RTD element at 300° C. is 212.052Ω, but when the resistance at 300° C. increases by 0.77Ω due to aging, the resistance becomes 212.822Ω. In this case, the resistance changes per temperature is 0.385/1° C. in a system using the RTD element, and thus, a feedback controller determines that the temperature of a thermal medium has increased by 2° C., and lowers the temperature of the thermal medium by 2° C. in order to adjust the process temperature to 300° C. corresponding to the initially set 212.052Ω. In this case, the actual temperature of the thermal medium becomes 298° C., which is 2° C. lower than the target process temperature.

For this reason, a temperature control error range is set in a temperature control system, and a controller does not recognize, as an error, a temperature value that gradually changes within the set range. However, when the temperature value changes slowly and gradually 40 times within 0.1° C. (resistance value: 0.0385Ω), there may eventually be a maximum variation of 4° C. from the process setpoint temperature, and afterwards, maintaining the target temperature of the thermal medium fails. Changes in temperature during a process, which occurs due to changes in resistance of a sensor itself, may only be recognized after a defect in a product process occurs. In order to alleviate this problem, it would be good to set a system more sensitively by slightly reducing a target setting range, but the error rate of the system may gradually increase and facility operation downtime may increase.

B. Thermal Actuator (Heater or Heat Absorber)

A thermal actuator, especially a heater, also exhibits changes in internal resistance over time. This is because the volume, area, and length of the thermal actuator change depending on temperature, and the thermal actuator undergoes oxidation.

As may be understood from Joule's law, $Q=P=V^2/R$, which calculates energy (Q) or power (P) from voltage (V) and resistance (R), when load resistance (R) changes, the energy (Q) also changes, and in particular, when the resistance (R) increases, the energy (Q=P) decreases. According to this decrease in energy, a change (decrease) in energy that is supplied to a thermal medium or a target object occurs.

C. Change in the Applied Voltage to a Thermal Actuator

According to Joule's law, a heating value Q (W) is proportional to the square of applied voltage (V), and thus even small changes in voltage affect applied energy, resulting in a difference in control temperature ($\Delta T$).

Due to the above causes, abnormalities occur in temperature control of a target object, resulting in process defects and thereby resulting in adverse effects on product productivity, including reduced product yield.

SUMMARY

Provided are an advanced temperature method and system.

Provided are a temperature control method and system capable of suppressing temperature control failure by measuring aging and changes in components used in the temperature control system and reflecting the same in temperature control.

Provided are a temperature control method and system capable of reducing temperature control defects or process defects and thereby increasing product yield.

Provided are a temperature control method and system that allows the system to operate for a longer period of time without operation interruption by predicting occurrence of defects and also having a function of compensating for changes between elements.

Provided are a temperature control method and system enabling continuous maintenance of an initial setting state by identifying and compensating for changes by the system itself by providing notification of causes of and solutions for defects in real time or periodically.

In addition, provided are a method and apparatus for detecting changes in power applied to a heating element and changes in resistance of a thermal actuator and a sensor, and an intelligent automatic temperature compensation system and control method thereof.

Additional aspects will be set forth in part in the description which follows and, in part, will be apparent from the description, or may be learned by practice of the presented embodiments of the disclosure.

According to an aspect of the disclosure, a system includes a thermal medium on which an object of which temperature is to be controlled, which is an object to be heated and/or cooled, is mounted, one or more resistant thermal actuators installed on the thermal medium to heat and/or cool the object of which temperature is to be controlled, a power controller configured to supply controlled power to the one or more thermal actuators, one or more main sensors configured to detect temperature of the thermal medium, one or more resistance measurement units configured to detect characteristic resistance of at least one of the one or more thermal actuators and/or the one or more main sensors, and a feedback controller configured to calculate a measurement error or an error of the one or more thermal actuators and/or the one or more main sensors from the temperature obtained from the one or more main sensors and the characteristic resistance obtained by the one or more resistance measurement units, and based on the measurement error or the error, generate a power control signal for the power controller.

According to one or more embodiments, the feedback controller may be further configured to compensate for the temperature measured by the one or more main sensors according to an error with respect to a reference value due to a change in the characteristic resistance, and compensate for a reference setpoint of the one or more thermal actuators and/or the one or more main sensors.

According to one or more embodiments, the temperature control system may further include:

a thermal source power unit configured to supply power to the power controller; and a power change detector configured to detect, from the thermal source power unit, input power that is applied to the thermal source power unit, wherein the power controller may be further configured to detect a power input value from the power change detector and transmit the power input value to the feedback controller, and the feedback controller may be further configured to compare the power input value with a reference value and compensate for the power control signal that is applied to the power controller, according to an error between the power input value and the reference value.

According to one or more embodiments, the power change detector may be further configured to count pulses from the feedback controller and multiply the number of pulses obtained by the counting by reference power per pulse to detect the power input value.

According to one or more embodiments, the temperature control system may further include one or more auxiliary (secondary) sensors configured to measure temperature of the one or more thermal actuators, wherein the feedback controller may be further configured to compare the temperature detected by the one or more auxiliary sensors with the temperature detected by the one or more main sensor, calculate an error between the temperatures, and based on the error, compensate for the power control signal that is applied to the power controller.

According to one or more embodiments, the one or more main sensors may each be a resistance temperature detector (RTD) sensor, and the one or more auxiliary sensors may each be a thermocouple (TC) sensor with a thermocouple.

According to one or more embodiments, the feedback controller may be further configured to detect the error by applying a machine learning or deep learning-based model.

According to one or more embodiments, the one or more resistance measurement units may be further configured to measure the characteristic resistance of the one or more thermal actuators and/or the one or more main sensors in real time during a normal (steady-state) process of the one or more thermal actuators and/or the one or more main sensors.

According to one or more embodiments, the one or more resistance measurement units may be further configured to measure the characteristic resistance of the one or more thermal actuators and/or the one or more main sensors in real time during a normal process of the one or more thermal actuators and/or the one or more main sensors.

According to one or more embodiments, the temperature control system may further include, in a test process for measuring the characteristic resistance of the one or more thermal actuators and/or the one or more main sensors, a circuit switching unit configured to separate the one or more thermal actuators and/or the one or more main sensors from a circuit for normal operation and circuitously connect the one or more thermal actuators and/or the one or more main sensors to one or more resistance measurement units.

According to one or more embodiments, the circuit switching unit may include one or more mechanical and/or semiconductor relay apparatuses, and wherein the feedback controller may be further configured to generate a detection control signal for operating the circuit switching unit according to a process flow.

According to another aspect of the disclosure, a temperature control method includes supplying, by a power controller, power to one or more thermal actuators, thermally heating and/or cooling, by the one or more thermal actuators, a thermal medium on which an object of which temperature is to be controlled is arranged, performing a main temperature detection operation in which one or more main sensors detect temperature of the thermal medium, performing a characteristic resistance detection operation in which one or more resistance measurement units detect characteristic resistance of at least one of the one or more thermal actuators and/or the one or more main sensors, and performing a control signal generation operation in which a feedback controller calculates a measurement error or an error of the one or more thermal actuators and/or the one or more main sensors from the temperature obtained from the one or more main sensors and the characteristic resistance obtained by the one or more resistance measurement units, and based on the measurement error or the error, generates a power control signal for the power controller.

According to one or more embodiments, the feedback controller may compensate for the temperature measured by the one or more main sensors according to an error with respect to a reference value due to a change in the characteristic resistance, and compensate for a reference setpoint of the one or more thermal actuators and/or the one or more main sensors.

According to one or more embodiments, the temperature control method may further include supplying, by a thermal source power unit, power to the power controller, and detecting, by a power change detector, from the thermal source power unit, input power that is applied to the thermal source power unit, and transmitting the input power to the feedback controller, wherein the feedback controller compares a value of the input power with a reference value and compensates for the power control signal that is applied to the power controller, according to an error between the value of the input power and the reference value.

According to one or more embodiments, the temperature control method may further include counting, by the power change detector, pulses from the feedback controller and multiplying the number of pulses obtained by the counting by reference power per pulse to detect the value of the input power.

According to one or more embodiments, the temperature control method may further include performing an auxiliary (temperature) detection operation in which one or more auxiliary sensors measure temperature of the one or more thermal actuators, wherein the feedback controller compares the temperature detected by the one or more auxiliary sensors with the temperature detected by the one or more main sensors, calculates an error between the temperatures, and based on the error, compensates for the power control signal that is applied to the power controller.

According to one or more embodiments, an RTD sensor may be applied during the main temperature detection operation, and the auxiliary temperature detection operation of measuring the temperature of the one or more thermal actuators may be carried out by using a TC sensor.

According to one or more embodiments, the feedback controller may detect the error by applying a machine learning or deep learning-based model.

According to one or more embodiments, during the characteristic resistance detection operation, the one or more resistance measurement units may measure the characteristic resistance of the one or more thermal actuators and/or the one or more main sensors in real time during a normal process of the one or more thermal actuators and/or the one or more main sensors.

According to one or more embodiments, during the characteristic resistance detection operation, the one or more resistance measurement units may measure the characteristic resistance of the one or more thermal actuators and/or the one or more main sensors in real time during a normal process of the one or more thermal actuators and/or the one or more main sensors.

According to one or more embodiments, the temperature control method may further include disconnecting, by a circuit switching unit, the one or more thermal actuators and/or the one or more main sensors from a circuit for normal operation during the characteristic resistance detection operation and circuit-connecting the one or more thermal actuators and/or the one or more main sensors to the one or more resistance measurement units.

According to one or more embodiments, the circuit switching unit may perform the circuit connection by using one or more mechanical and/or semiconductor relay apparatuses during the characteristic resistance detection operation, wherein the feedback controller may be configured to generate a detection control signal for operating the circuit switching unit according to a process flow.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 14 illustrates a plurality of zones in a thermal medium, in which a thermal actuator may be installed, which may be applied to embodiments;

DETAILED DESCRIPTION

Figure 1:
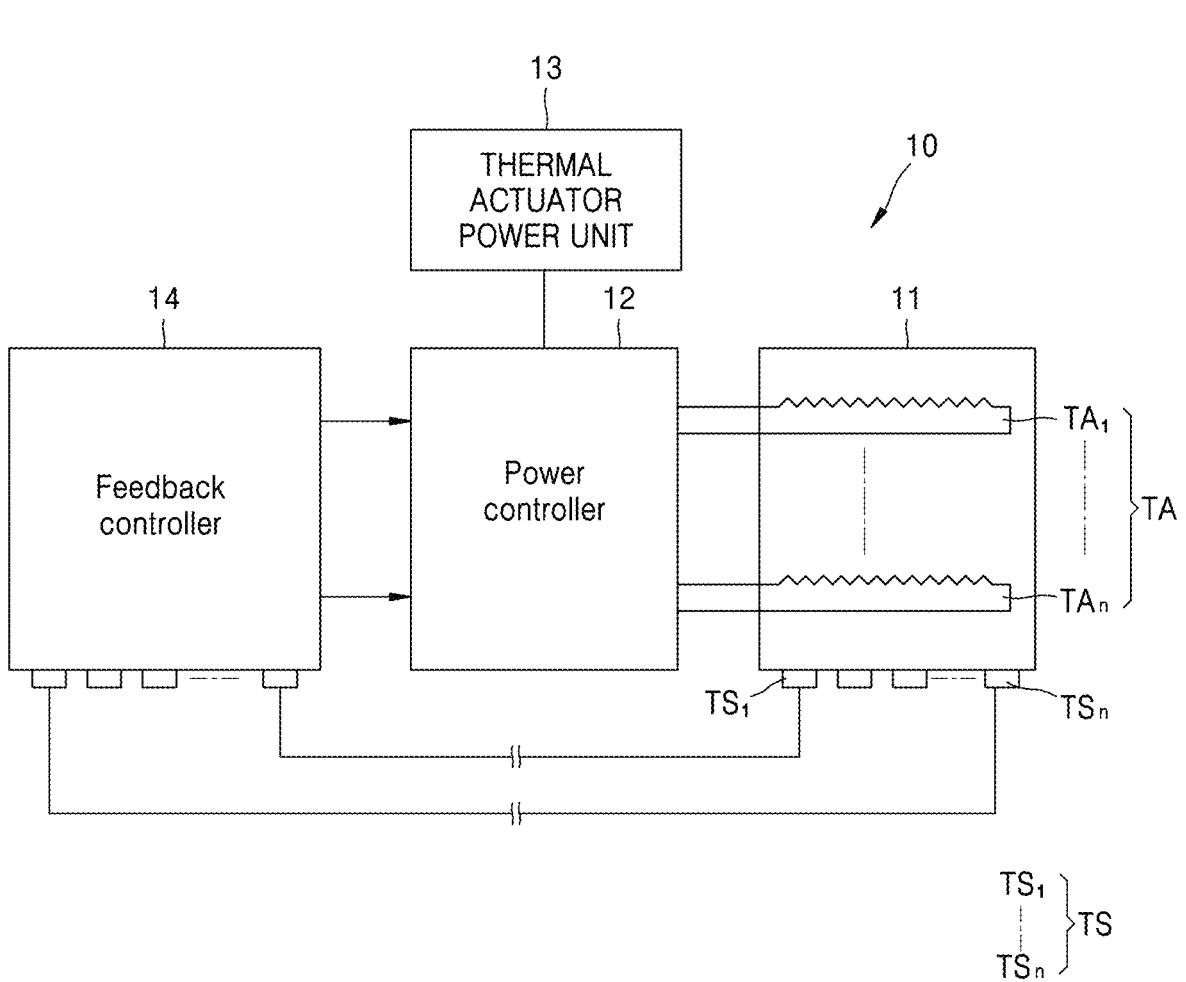
FIG. 1 is a block diagram showing a schematic configuration of a conventional temperature control system.
Figure 2:
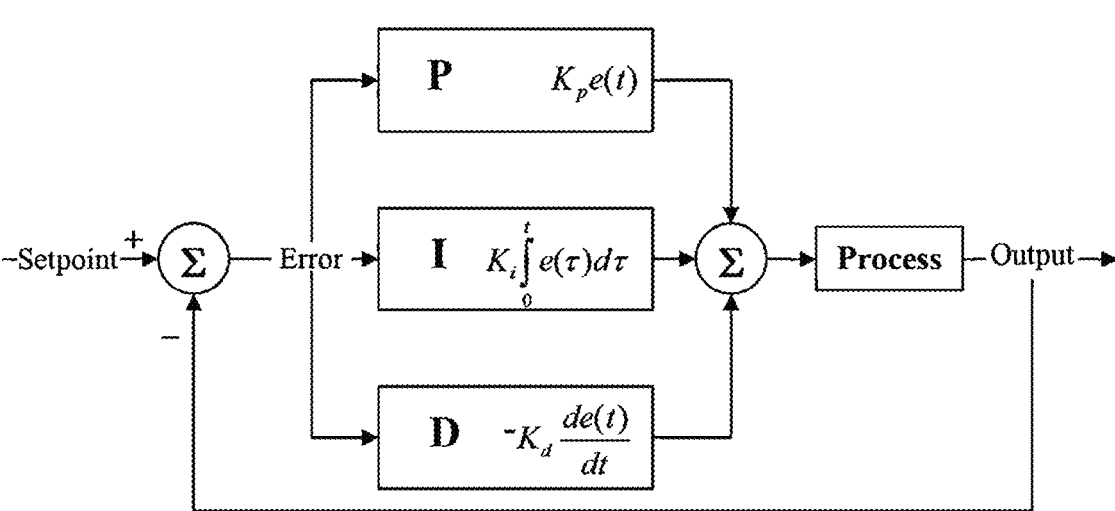
FIG. 2 is a block diagram including an equation describing a general PID control method.

Reference will now be made in detail to embodiments, examples of which are illustrated in the accompanying drawings, wherein like reference numerals refer to like components throughout the specification. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of components, modify the entire list of components and do not modify the individual components of the list.

Hereinafter, embodiments will be described in detail with reference to accompanying drawings. However, embodiments may be embodied in many different forms and should not be construed as being limited to the embodiments set forth herein. Rather, embodiments are provided so that the disclosure will be thorough and complete, and will fully convey the inventive concept to those skilled in the art. Like reference numerals in the drawings denote like elements. Furthermore, various elements and zones in the drawings are schematically shown. Therefore, the inventive concept is not limited by relative sizes or spacing shown in the accompanying drawings.

Terms such as "first," "second," etc. may be used to describe various components, but the components are not limited by the terms. The above terms are used only to distinguish one element from another element. For example, a first component may be referred to as a second component, and conversely, the second component may be referred to as the first component, without departing from the sprit and scope of the inventive concept.

The terms used in the present specification are merely used to describe particular embodiments, and are not intended to limit the inventive concept. The singular expressions "a," "an," and "the" are intended to include the plural expressions as well, unless the context clearly indicates otherwise. Also, it will be understood that the terms "including," "having," and "comprising" used herein are intended to indicate the existence of features, numbers, steps, operations, components, and parts, described in the specification, or combinations thereof, and are not intended to preclude the possibility that one or more other features, numbers, operations, components, and parts, or combinations thereof may exist or may be added.

Unless otherwise defined, all terms used herein, including technical terms and scientific terms, have the same meaning as commonly understood by those skilled in the art. In addition, it will be understood that terms that are commonly used and are as defined in dictionaries should be interpreted to have meanings consistent with what they mean in the context of the relevant technology, and should not be interpreted to have an overly formal sense unless explicitly defined herein.

When a certain embodiment may be implemented differently, a specific process order may be carried out differently from the described order. For example, two consecutively described processes may be carried out substantially at the same time or carried out in an order opposite to the described order.

Hereinafter, according to one or more embodiments, a temperature control method and system are described in detail.

In the following description of the disclosure, a cooling method is occasionally mentioned, but a heating method and system are mainly described. The inventive concept is applicable to both heating and cooling, and it should be understood that the detailed description of a heating method and system does not mean that a cooling method and system depart from the scope of the disclosure.

The inventive concept is applicable to current heating and cooling temperature control systems. Currently, the configuration of general heating and/or cooling temperature control systems involves purchasing a universal-purpose temperature controller, purchasing a necessary sensor, a heat source (as a heater), and a heat absorber, and combining/configuring, for use, them on an object to be heated according to the intended purpose, and for a specialized application requiring a more precise and compact mechanical element and control, temperature control and peripheral apparatuses are designed independently for use according to the purpose. The following main function is generally included and used in resistant heater and/or heat absorber temperature control systems, whether universal purpose or self-designed.

Control algorithm: PID (proportional, integral, derivative)

Closed-loop control: Add feed forward in consideration of external variables

Current transformer (CT): Measure short circuits, changes and limits of power in use When using this function and component, defects in a temperature control system, which appear during a process, are generally as follows.

Overshooting of temperature of target object, in particular, object to be heated Occurrence of temperature hunting when maintaining set temperature Temperature detection error in temperature sensor Occurrence of product defects due to difference between set temperature and actual process temperature Overshooting refers to a deviation from a set temperature or a certain target value, and temperature hunting refers to a fluctuation within a small error range around the set temperature and occurs in the case of deviation from an error value range set in a temperature control system. The main causes of these phenomena are the changes in and agings of resistant elements, which causes a temperature control system to fail.

When such errors and resulting defects appear, equipment in use should be stopped, a temperature control system of the equipment should be disconnected, and the causes of the defects should be analyzed at room temperature. In such analysis, resistant elements and resistive components are especially inspected to identify the causes of changes in temperature.

However, the amount of change in resistance of the elements at room temperature shows a smaller deviation than the amount of change measured at a high process temperature. A resistance value measured at room temperature may not be identified as the causes of defects. The amount of change in resistance of the elements becomes increasingly larger at process temperatures of 100° C., 200° C., 300° C., and 400° C. than at room temperature of 23° C. However, usually, the causes of defects are checked by disconnecting a system at room temperature, and thus it may be challenging to identify the causes of defects at a process temperature. Moreover, temperature control errors may occur due to complex causes, such as abnormal fluctuations in applied power, changes in resistance of a heater and a temperature sensor, etc., and thus it may be more challenging to determine the temperature control errors.

In existing systems, changes in an applied voltage, by using a CT (current transformer) with the changes of current flowing through a resistant heater, may notify the changes and defects of the power source. Usually, CTs are widely used to identify disconnections in heaters. However, changes in current in a thermal actuator, for example, a heater, may result not only from changes in voltage across the thermal actuator, but also from changes in resistance of the thermal actuator itself. Therefore, in order to clarify the causes of changes in current, power supplied to the thermal actuator should be measured independently.

In order to identify the causes of defects in a temperature control system and repair the temperature control system, the diagnosis by experts in various fields is required. Depending on the level of expert, it may not be possible to identify the exact cause, and repairing the system incurs significant costs and time. Therefore, researches on methods and systems to address these issues are necessary.

Figure 3:
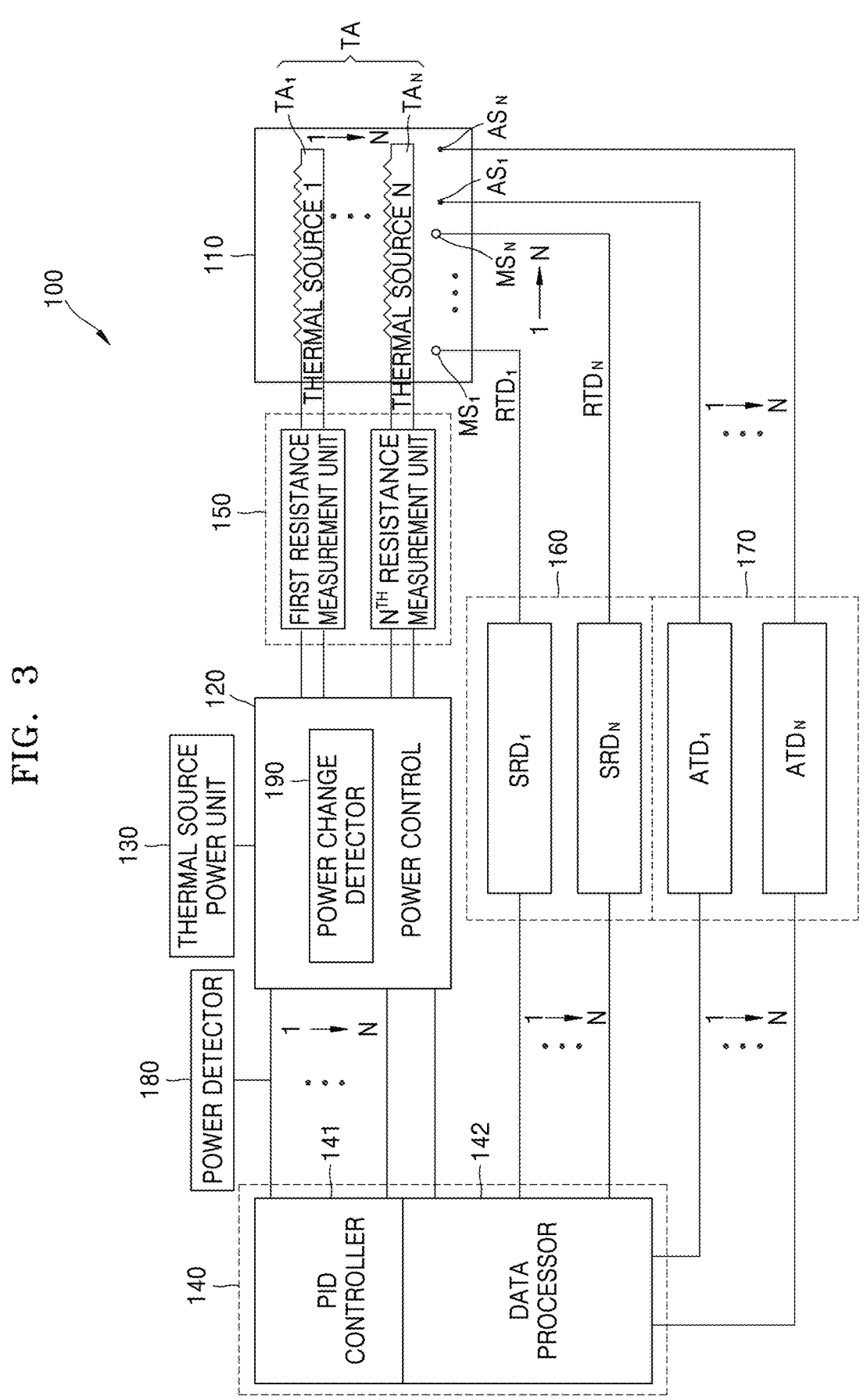
FIG. 3 shows a schematic overall configuration of a temperature control system that performs a method of controlling the temperature of a target object, according to the disclosure.

FIG. 3 shows a schematic overall configuration of a temperature control system that performs a method of controlling the temperature of a target object, according to the disclosure.

This system has an intelligent automatic temperature compensation function that responds to changes in external power and changes in resistance of a thermal actuator (heat source or heat absorber) and a resistive temperature sensor such as a resistance thermodetector (RTD).

Referring to FIG. 3, a temperature control system 100 according to the disclosure has one or more thermal media 110, one or more thermal actuators TA (TA$_1$ to TA$_n$), a power controller 120, a thermal actuator power unit 130, a power change detector 190, one or more resistant main sensors MS (MS$_1$ to MS$_n$), non-resistant auxiliary sensors AS (AS$_1$ to AS$_n$), and a feedback controller 140.

The thermal medium 110 is used to maintain various types of objects of which temperature is to be controlled or process specimens, for example, objects in a liquid, gas, or solid state, at a target temperature by heating or cooling. The thermal actuator includes, for example, a heating element formed by metallic alloy wire, such as nichrome wire, or various alloy pastes, and thermal actuators for absorbing heat or cooling may include, for example, a cooling element, such as a Peltier element, which is mainly used as a cooler to determine the direction of heat movement (transfer) by current flow. The heating element and the Peltier element are types of resistant elements, and in the disclosure, detect changes in their characteristic resistance.

The thermal actuator TA is, for example, a heater that directly heats the thermal medium 110 or a heat absorber that absorbs heat from the thermal medium 110, and one or more (n) thermal actuators are provided to correspond to one or more zones designated in the thermal medium 110.

The power controller 120 supplies controlled electrical power to each of the one or more thermal actuators TA$_1$ to TA$_n$, and the thermal actuator power unit 130 supplies AC or DC power to the power controller 120.

The power change detector 190 detects changes in power supplied from the thermal actuator power unit 130 to the thermal actuator TA. The main sensors MS$_1$ to MS$_n$ are each a first sensor that detects the temperature of the thermal medium 110, and are each a high-precision resistant sensor such as an RTD. The auxiliary sensors AS$_1$ to AS$_n$ are each a non-resistant second sensor and assist the main sensors MS$_1$ to MS$_n$.

The feedback controller 140 provides temperature control information about the thermal medium 110 to the power controller 120 to allow controlled power to be supplied the thermal actuator.

The temperature control system that performs the temperature control method, according to the disclosure, which is briefly described above has an existing closed-loop temperature control system as its base structure, and further includes at least one of the following elements.

I. Resistance value detector 150 for thermal actuator

II. Resistance value detector 160 for main temperature
       sensor

III. Temperature detector 170 for thermal medium or
       target object, by using auxiliary sensor IV. Supply power detector 180

V. Voltage change detector 190 for thermal actuator

In FIG. 3, reference signs "MS" and "AS" respectively refer to main sensor and auxiliary sensors, and the subscripts 1 to n, which are natural numbers, in each reference sign refer to their respective sensor's numbers, and the number of main sensors and the number of auxiliary sensors may vary.

As described above, the main sensors MS may be RTD elements, and the auxiliary sensors AS may be TC elements that are thermoelectric conversion element. The RTD elements that use changes in electrical resistance have excellent linearity, and thus, changes in resistance value according to temperature changes are stable. However, measurement errors due to changes in internal resistance may occur due to age-related changes over time. The TC elements have low precision, but have a high response speed, operate stably at high temperatures, and undergo fewer age-related changes. The auxiliary sensors AS that are TC elements may be used to detect comparative temperature data that is used to detect errors in the RTD main sensors MS.

The feedback controller 140 receives a temperature signal from the one or more main sensors MS and the auxiliary sensors AS both respectively corresponding to the one or more thermal actuators TA installed on the thermal medium 110, and thus calculates a temperature control value that is to be transmitted to the power controller 120.

The power controller 120 supplies supply power determined according to the control value for each of the one or more thermal actuators TA$_1$ to TA$_n$, by (based on) the control value transmitted from the feedback controller 140. The thermal actuators TA$_1$ to TA$_n$ supply heat to or absorb heat from a target object placed on the thermal medium 110, according to the amount or magnitude of supplied power.

Unlike in existing systems, the feedback controller 140 includes an input data processor 142 to which at least one of a resistance value of a heat source, a resistance value of a resistive sensor, an auxiliary temperature value obtained from the thermal medium 110 by a non-resistive sensor, and a power input value from the supply power detector 180 is input, and a PID controller 141 that generates a control value for the power controller 120, based on a processing result.

The resistance value of the heater may be measured by the first resistance value detector 150 installed in the middle of a power supply line leading from the power controller 120 to the heaters TS$_1$ to TS$_n$. The first resistance value detector 150 includes one or more resistance measurement units HRD$_1$ to HRD$_N$ that detect the resistance of each heat source. Likewise, the resistance of the main sensors RTD$_1$ to RTD$_n$ is measured by the second resistance value detector 160. The second resistance value detector 160 includes one or more sensor resistance detector SRD$_1$ to SRD$_N$ in a number corresponding to the main sensors.

Figure 4:
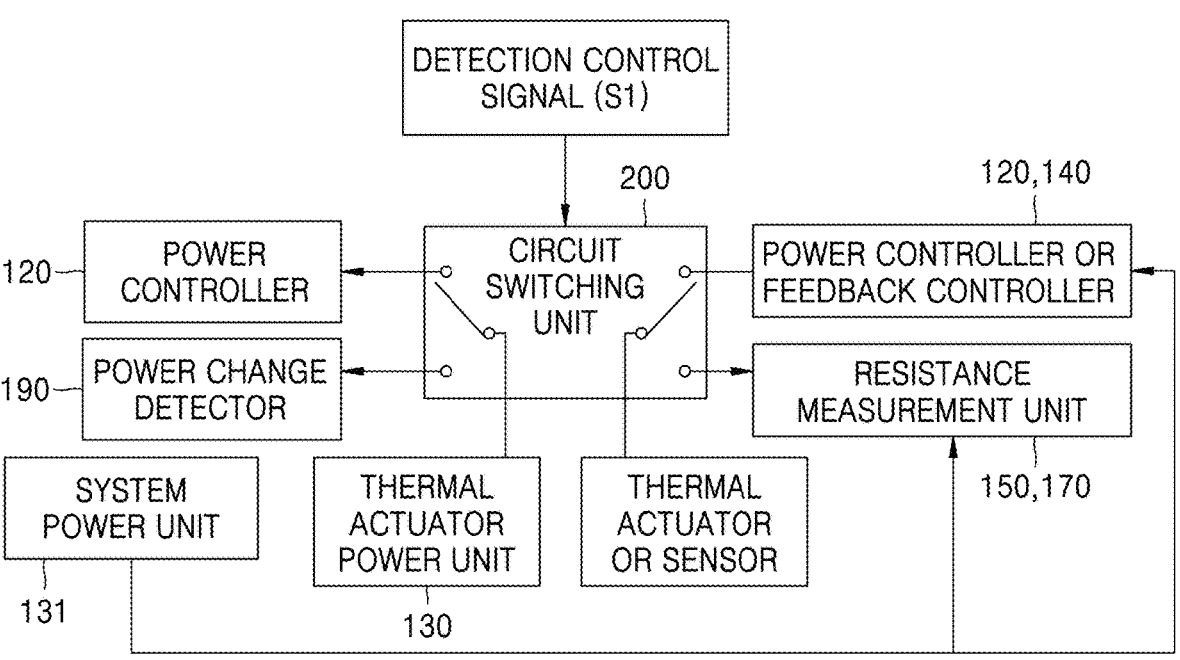
FIG. 4 shows a schematic configuration for detecting a change in power and detecting resistance which is a characteristic variable of each of a thermal actuator and a sensor, according to an embodiment.

The schematic configuration for detecting changes in power and detecting the resistance, which is a characteristic variable, of a thermal actuator and a sensor is as shown in FIG. 4.

First, to summarize, when detecting changes in power and detecting resistance of a thermal actuator and a sensor, these detections may be separated (isolated) from associated normal operation-related circuits, thereby reducing or eliminating measurement errors. In other words, the detectors for detecting changes in power applied from an external power source to a power controller, and resistances of the heater source and sensor resistance may be separated from load elements that are normally connected thereto during a process operation. This is to prevent detection errors caused by the loads in the detecting voltage, resistance, etc.

Referring to FIG. 4, a circuit switching unit 200 may be operated by a detection control signal S1 that may be generated by the feedback controller 140, wherein the circuit switching unit 200 may include a circuit-changing component such as one or more mechanical and/or semiconductor relay apparatuses. The circuit switching unit 200 selectively connects at least one of the power controller 120 and the power change detector 190 to the thermal actuator power unit 130, connects one of the power controller 120 and the first resistance measurement unit 150 to the thermal actuators $TA_1$ to $TA_n$, and connects one of the feedback controller 140 and a sensor resistance measurement unit 170 to a sensor.

When the circuit switching unit 200 operates, in particular, while detection of power fluctuations for the power unit 130 is performed, power from the power unit 130 is not delivered to the thermal actuator consuming the power, but is applied to the power change detector 190, such that power fluctuations are detected. A system power unit 131 in FIG. 4 supplies constant voltage to the entire internal system including the circuit switching unit 200, the feedback controller 140, etc., and operates while the system is operating.

This is to ensure that the detection control signal S1 is to separate, on the time axis, a normal process operation of each device or elements from a signal detection operation for detecting a characteristic value (characteristic variable, such as voltage, resistance, etc.) of each device or element. During a process, a detection control signal for real-time measurement is separated into process time and detection time. During periodic system preliminary inspection (preventive maintenance (PM)), the values may be measured by using a separate detection and control method.

Such circuit changes are to reduce or eliminate measurement errors. A real-time process operation and a detection operation may be carried out in parallel without circuit switching, and the detection operation may also be carried out intermittently.

Figure 5:
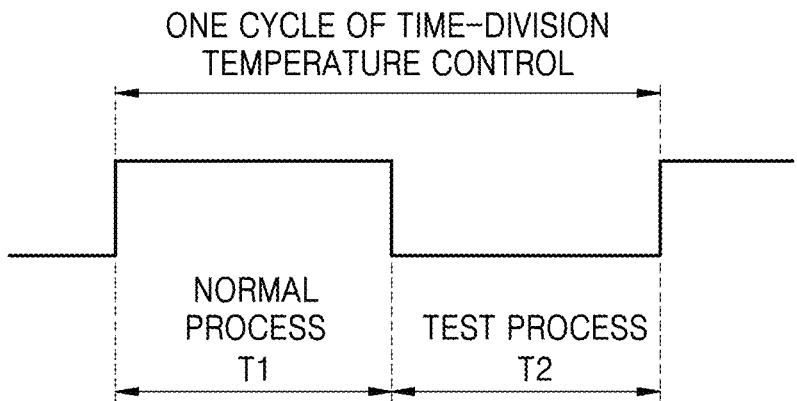
FIG. 5 is a timing chart describing a time-division operation for detecting a characteristic variable, according to an embodiment.

According to an embodiment, in carrying out the process operation and the measurement operation as described above, the process operation and the measurement operation may be carried out alternately in a time-division manner. FIG. 5 is a diagram describing time-division performance of a process operation and a measurement operation.

Referring to FIG. 5, it is desirable to apply a time-division system. Real-time measurement without time division is possible by using a high-impedance measurement probe, but measurement errors may occur due to interference from existing circuits during the measurement.

Therefore, a normal operation period (T1) and a measurement operation period (T2) are applied to allow a normal (steady-state) process and a measurement process to be alternately carried out on the time axis.

For example, when one cycle needs to be set to 50 ms, normal process temperature control (T1) is carried out for 25 ms, and detection and compensation (T2) is carried out for the remaining 25 ms. If it is not possible to carry out T1 and T2 within 50 ms, real-time detection and compensation may not be applied. Real-time measurement requires application of a high-performance processor or application of a multi-processor.

Figure 6:
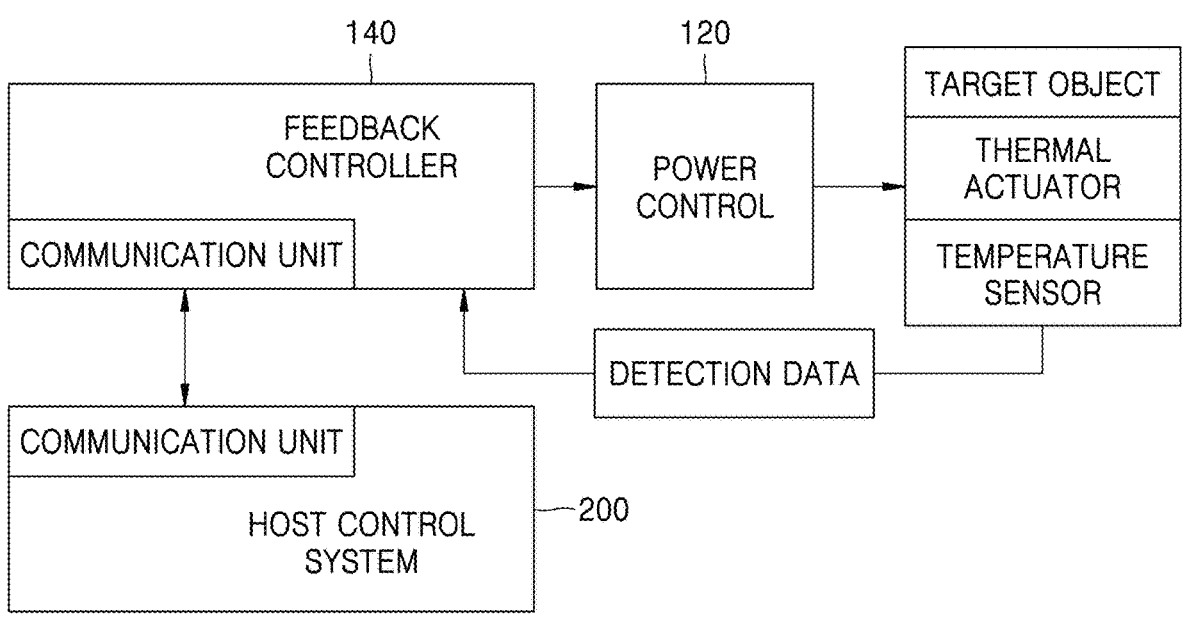
FIG. 6 is a block diagram showing a connection structure of a feedback controller and a host computer through a communication unit, according to an embodiment.

In another configuration, when the processing speed is limited due to hardware limitations of the feedback controller 140, a host computer 200, which is connected to the feedback controller 140 through a communication unit, is provided as shown in FIG. 6 to transmit various operation variables of the feedback controller 140 and detection data from a sensor and a thermal actuator to the host computer 200 to calculate certain necessary parts, PID, and compensation values and transmit them back to the feedback controller 140 to carry out a temperature control process.

Figure 7:
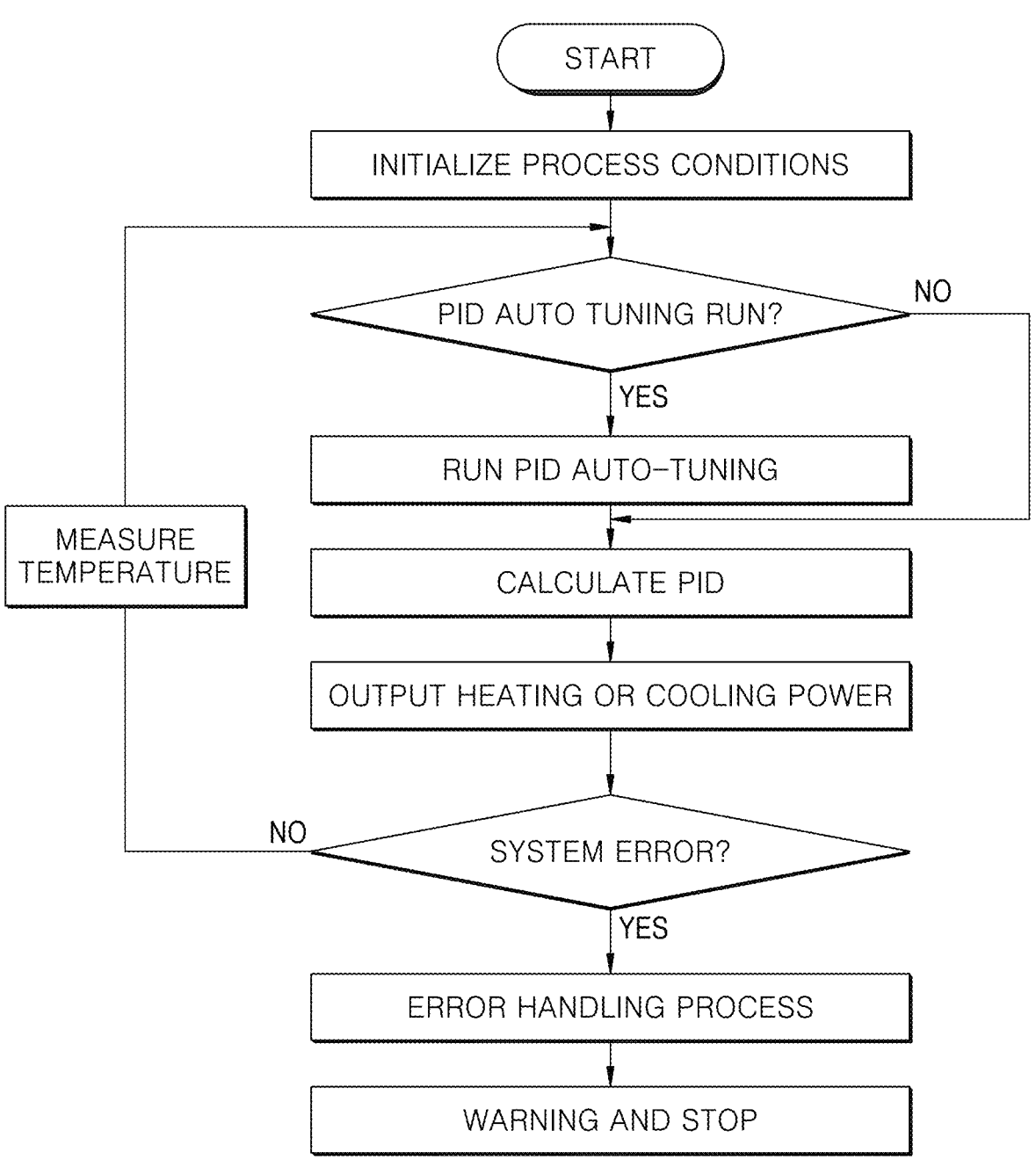
FIG. 7 is a schematic process flowchart of a temperature control method according to an embodiment.

A temperature control flow in existing temperature systems, as shown in FIG. 7, is as follows.

Controlling or regulating the temperature of a target object by using existing PID control involves repeating processes such as temperature measurement, PID operation, and output control with respect to a thermal actuator. In detail, a process temperature, initial PID values, a maximum amount of power, an offset value, an error limit value, etc. are initialized at the start of temperature control. The initial PID values are necessary to maintain, up to a set temperature, heating and/or cooling of an object of which temperature is to be controlled, and the offset value is to compensate for a difference between the temperature of a target object and the temperature of a process specimen. In addition, a maximum power value may be adjusted for each heater in each zone and thus a control current limit amount according to the maximum amount of power can be set. In such a PID-based control process, PID auto-tuning may run depending on whether it is necessary to carry out PID auto-tuning, and then power required for temperature control following PID operation is output according to a temperature value monitored, that is, detected from a target object. As long as no errors occur, the routine as described above continues to be repeated over a given period, a given time, or until a separate control signal is provided, and during this process, a limit value of current fluctuations of an external power source is referenced with the detected current value by using a CT, confirmation of power changes and defects and short circuit defects can be done.

Figure 8A:
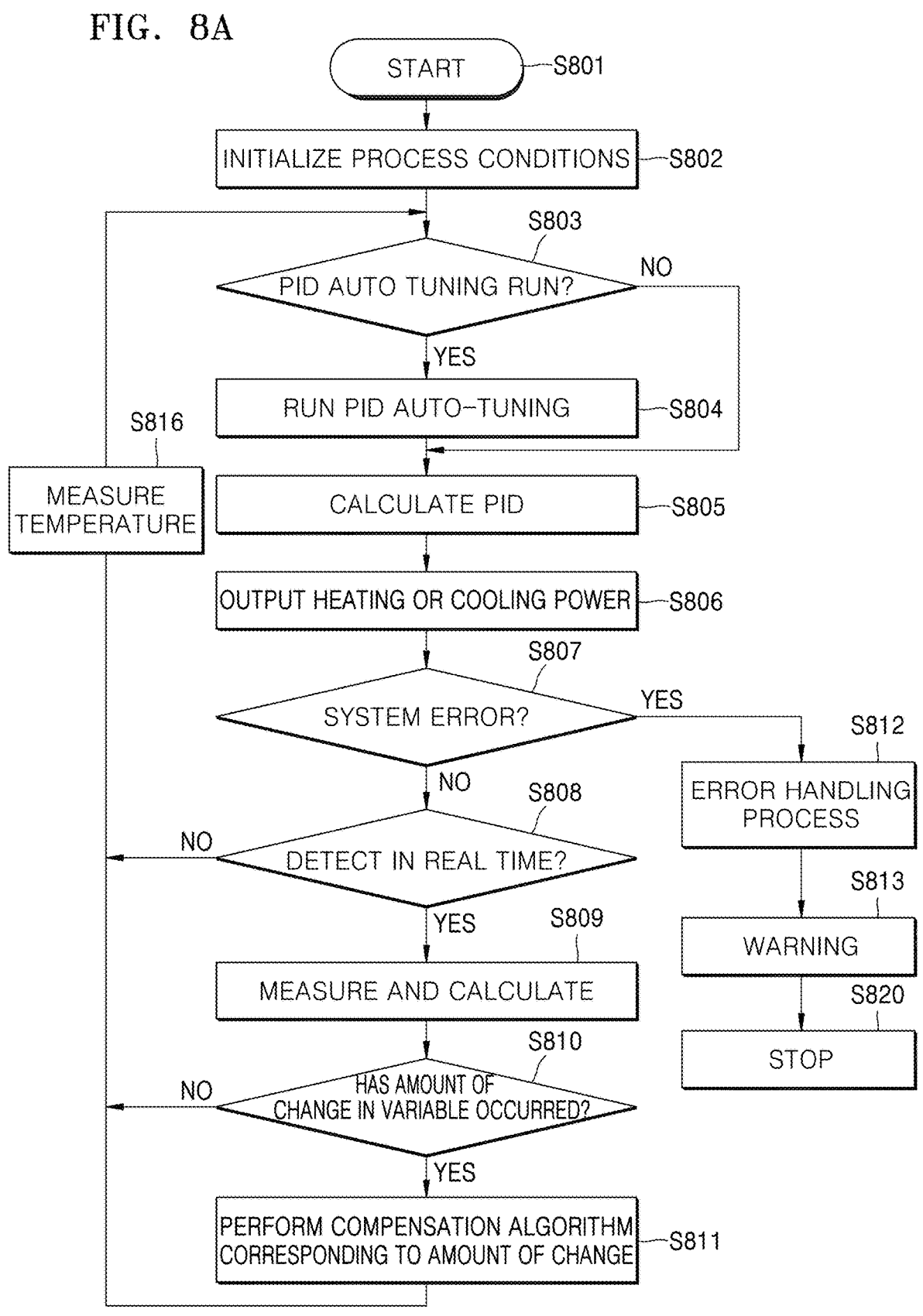
FIG. 8A is a schematic flowchart of a temperature control method according to another embodiment.
Figure 8B:
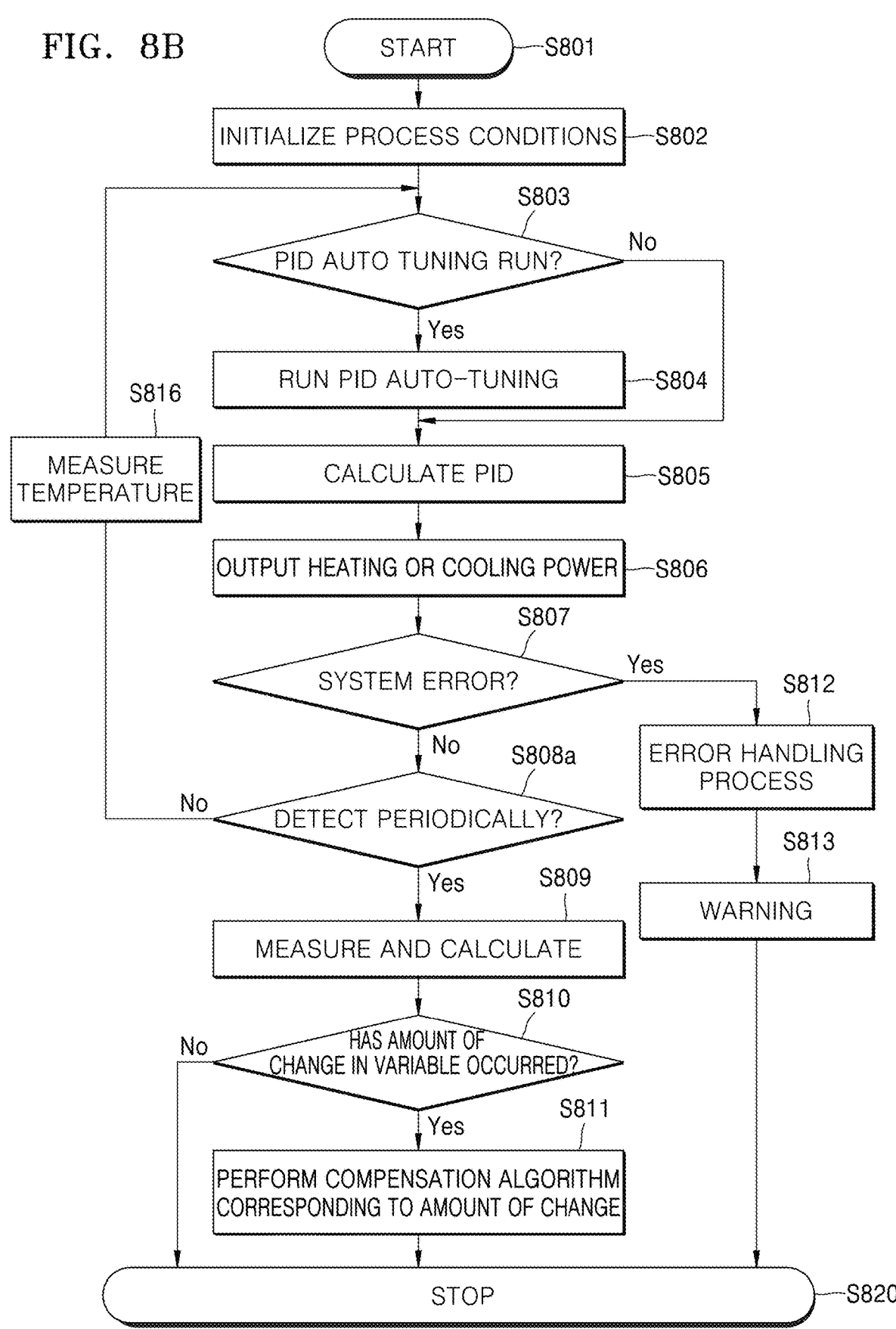
FIG. 8B is a schematic process flowchart of a temperature control method according to another embodiment.

FIGS. 8A and 8B are schematic flowcharts describing a temperature control method according to the disclosure.

As shown in FIGS. 8A and 8B, the present method includes detecting the following values and, based on the detected values, processing and compensating for data, after outputting heating or cooling power in the existing method.

In this process, in order to carry out the temperature control method according to the disclosure, at least one of the following parameters, that is, characteristic variables, for temperature control is extracted, and, using the same, compensation processing according to the disclosure is carried out.

1) Resistant sensor's own resistance value
2) Thermal actuator's own resistance value
3) Applied power value for thermal actuator
4) Temperature value measured by non-resistantive sensor As described above with reference to FIG. 3, the extraction of the above variables is carried out by the resistance value detector 150 for the thermal actuator, the resistance value detector 160 for the main temperature sensor, the temperature detector 170 for the thermal medium or the target object by the auxiliary sensor, the supply power detector 180, and the voltage change detector 190 for the thermal actuator.

FIG. 8A shows a real-time process of a method according to the disclosure, in which real-time error correction or compensation is carried out in a closed-loop temperature control process.

Operation S801: Power supply with respect to a temperature control apparatus is started so as to begin a process of temperature control with respect to a target object.

Operation S802: In this operation, initialization of process conditions is carried out. In this operation, a process temperature, initial PID values, a maximum amount of power, an offset value, an error limit value, etc. are set, and according to the disclosure, initialization for error-correcting parameters, and real-time extraction of the error-correcting parameters, and/or setting of a bit value regarding whether to proceed with aperiodic PM are performed.

Operation S803: Whether to proceed with PID auto-tuning every cycle is determined, and according to a result of the determination, the process proceeds to operation S804 or operation S805.

Operation S804: In this operation, PID auto-tuning is carried out. This process is a process for automatically adjusting parameters (proportional, integral, derivative) of a PID control system to optimize response characteristics of the system, and accordingly, the time and effort of manually tuning the parameters is saved, and the control performance of the system may be improved. Representative PID auto-tuning methods include Ziegler-Nichols, Cohen-Coon, relay control, and model-based methods.

Operation S805: This operation is a PID operation step and uses at least one of P, I, and D controls. Each control method is described as follows.

P (Proportional): A value proportional to a current error is used to adjust an output. For example, a larger control output is generated for a large error, and a small control output is generated for a small error.

I (Integral): A value proportional to an integral value of an error is used to adjust an output, compensating for accumulated errors that have occurred over a long period of time, and thereby improves the stability of the system.

D (Derivative): A value proportional to the rate of change in errors is used to adjust an output, reacting sensitively to rapidly changing errors, and thereby reduces overshooting of the system.

Operation S806: This operation is an operation of applying control output, and a result value according to the PID operation is supplied to a thermal actuator.

Operation S807: Control output is provided to a thermal actuator, etc. according to existing methods, and then occurrence of an error in the system in operation is detected to determine whether to continue temperature control. If there is an error, the system is stopped (S820) through an error handling process in operation S812 and warning in operation S813.

Operation S808: Following operation S807, whether to proceed with a real-time compensation process is determined, and in this regard, when real-time detection is not set, the process returns to the above-described operation S803 after going through a temperature detection process for a thermal medium in operation S816 as a temperature monitoring operation.

This operation belongs to T1 period in time-division control described in FIG. 5, and this T1 period includes the above described operation S803 to operation S808, and operation S816 which is a temperature monitoring operation.

Operation S809: In this operation, as the characteristic variables described above, the resistant sensor's own resistance value, the thermal actuator's own resistance value, the applied power value for the thermal actuator, and the temperature value measured by the non-resistant sensor are measured, and according to a result of the measurement, the measured value is compared with a normal reference value to calculate the corresponding amount of change. This operation belongs to T2 period in time-division control described in FIG. 5, and this T2 period is included up to operation S811 described later.

Operation S810: Whether a result value obtained through operation S809 falls outside an allowed range, that is, whether there is a significant amount of change, is determined, and when it is determined that when there is no significant amount of change, the process returns to operation S803 through operation S816.

Operation S811: When the significant amount of change is detected in operation S810, a compensation algorithm based on the significant change is performed and then reflected in reference values of temperature control, and then the process returns to operation S803 through operation S816. This compensation algorithm is described later again.

FIG. 8B is a flowchart of a method in which the compensation process according to the disclosure is performed over a given time or an aperiodic determination time rather than in real time. In FIG. 8B, operations of a process, which are the same as the operations of the process of FIG. 8A, are given the same reference numerals for convenience.

After going through operation S801 to operation S807, when a system error is detected, a system stops at operation S820 through operation S812 and operation S813 as described above.

In addition, in a normal state in which there is no system error, the process proceeds to operation S809 as described above. As described above, when the amount of change calculated in the measurement and calculation operation (operation S809) is determined as a significant amount of change in operation S810, a compensation algorithm based on the amount of change is performed and reflected in reference values of temperature control in operation S811, and then system operation is stopped in operation S820. At this time, according to another embodiment, operation S809 to operation S811 may be repeated a plurality of times, and this is a repetition routine when compensation is not satisfactory even by operation S811.

The temperature control method according to the disclosure includes, during a process of performing the existing method, a compensation process of detecting at least one of a plurality of characteristic variables, such as the resistant sensor's own resistance value, the thermal actuator's own resistance value, the applied power value for the thermal actuator, and the temperature values measured by the non-resistantive sensor, as described above, and based on the detected at least one of the plurality of characteristic variables, reflecting the detected at least one of the plurality of characteristic variables in temperature control.

This compensation process may be applied to various process flows other than those shown in FIGS. 8A and 8B.

Figure 9:
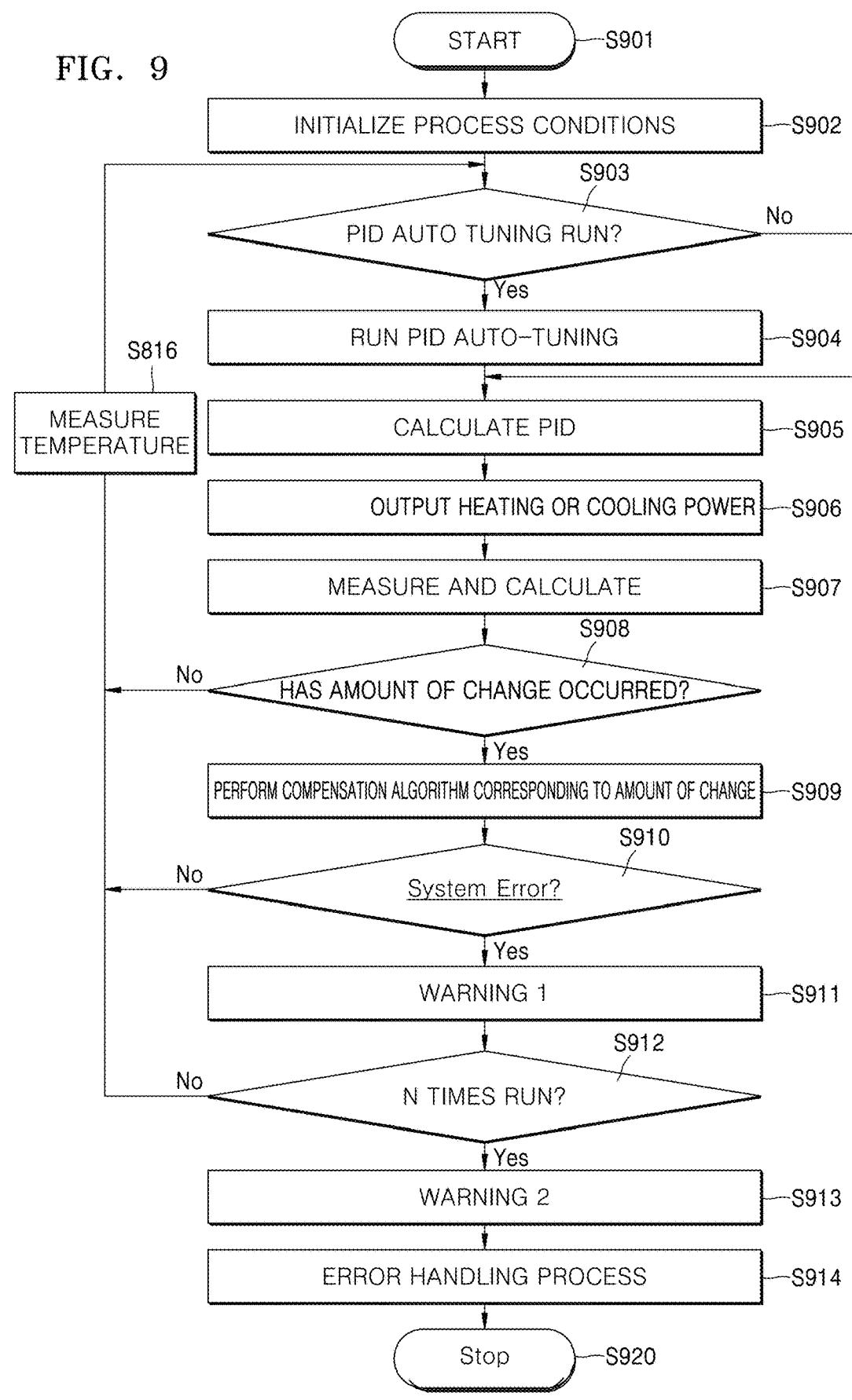
FIG. 9 is a schematic process flowchart of a temperature control method according to another embodiment.

FIG. 9 is a process flowchart of stopping system operation when a compensation process continues even though the compensation process has been performed a limited number of times.

In this process, temperature control is carried out according to the existing method, and when it is time for PM control, PM including the compensation process according to the disclosure is performed on a temperature control loop, and after this process is carried out a plurality of times, when the amount of change in characteristic variable is detected, that is, when there is an abnormal fluctuation in an internal element, the entire process is stopped.

The process of FIG. 9 for temperature control according to another embodiment is described below.

Operation S901: Power supply with respect to a temperature control apparatus is started so as to begin a process of temperature control with respect to a target object.

Operation S902: In this operation, initialization of process conditions is performed as in operation S802 described above.

Operation S903: Whether to proceed with PID auto-tuning every cycle is determined as in operation S803 described above.

Operation S904: In this operation, PID auto-tuning is carried out as in operation S804 described above.

Operation S905: This operation is a PID operation step which is the same as in operation S805 described above.

Operation S906: This operation is an operation of applying a control output, and a result value according to the PID operation is supplied to a thermal actuator.

Operation S907: This operation is included in an operation for the compensation process, and measurement and calculation are carried out as in operation S809 described above. In this operation, as described in the above, This operation belongs to T2 period in time-division control described in FIG. 5, which may include operation S907 through S912.

Operation S908: In this operation, a significant change in the result value obtained through operation S907 is determined as in operation S810 described above, and whether to measure temperature in operation S913, which is a return operation, or to proceed to operation S909, which is a compensation operation, is determined.

Operation S909: In this operation, compensation is carried out with respect to a temperature control reference value corresponding to a change in characteristic parameter, as in operation S811 described above. In other words, when a significant amount of change is detected in the previous operation, a compensation algorithm based on the change is performed and applied to temperature control to compensate for or calibrate one or more reference values.

Operation S910: In this operation, errors in the entire system or some elements are detected, and depending on the presence or absence of the errors, whether to proceed to operation S911 or operation S913 is determined.

Operation S911: This operation is an operation of warning error detection, wherein the error detection is notified through on-site workers or system servers, and the process proceeds to operation S912.

Operation S912: This operation is an operation of counting a detected number of system errors. Whether the number of times of that operation S910 has been performed in a closed-circuit circulation process has reached N which is a set number is determined, and if so, it is determined that the process is to proceed to operation S914 which is a final secondary warning operation, and, if not, it is determined that the process is to return to operation S904 through operation S913.

Operation S914: This operation is an operation of performing a secondary warning and entering an operation of stopping the operation of the entire system.

Operation S914 also is an operation in which a final error processing process as in operation S812 described above is carried out.

Operation S920 is a final end operation following the error processing process of operation S914, and after this operation, a process for reviewing and resolving system errors is carried out.

Hereinafter, specific unit technologies applied to the method of the disclosure are described.

Figure 10:
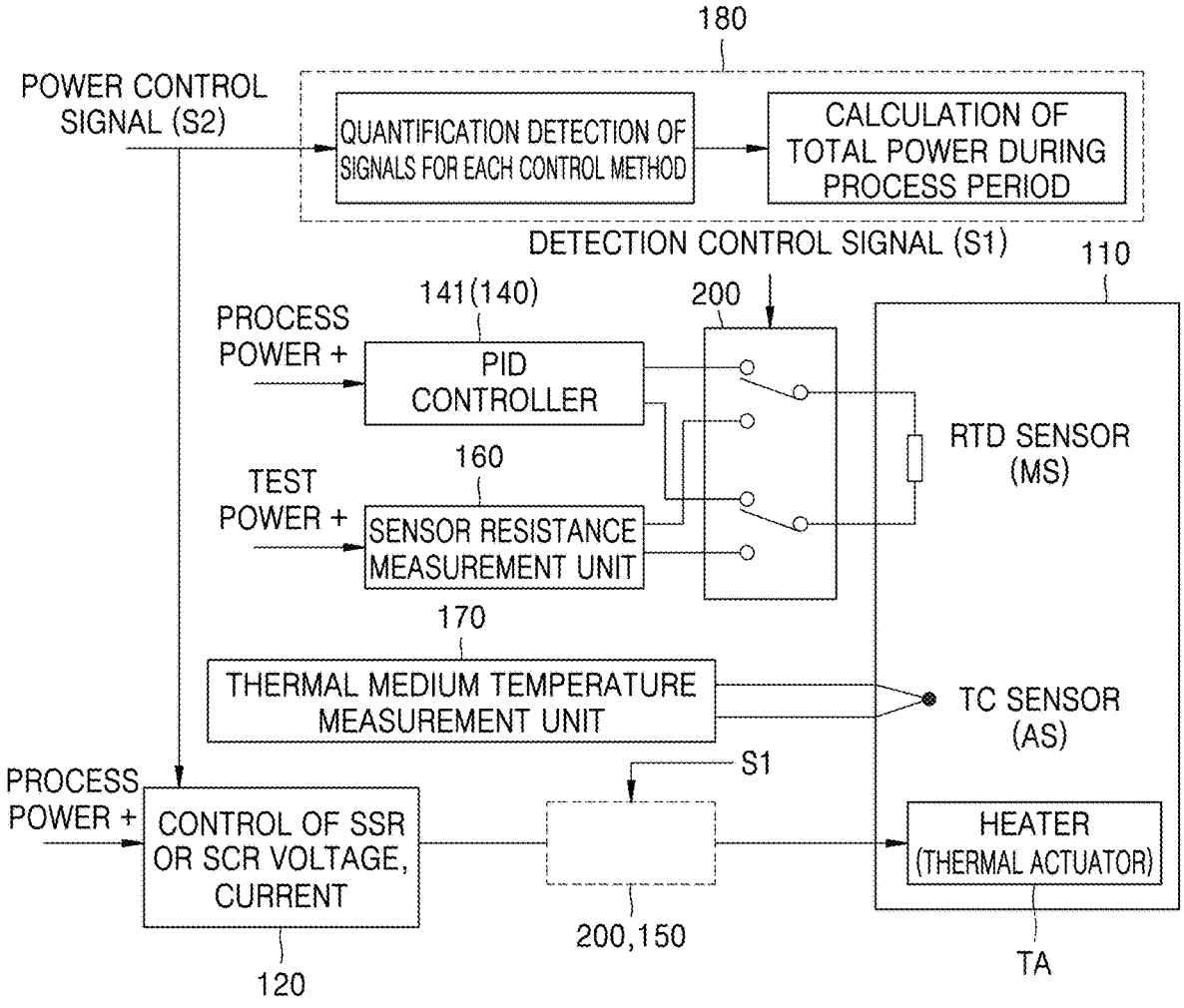
FIG. 10 is a schematic block diagram showing a more detailed and logical flow of the structure of FIG. 4, according to another embodiment.

FIG. 10 shows a configuration of detecting a change in power and detecting the resistance, which is a characteristic variable, of a thermal actuator and a sensor by further specifying the structure in FIG. 4.

As described above with reference to FIG. 4, when detecting the resistance of the thermal actuator TA and the main sensor MS, this configuration separates the thermal actuator TA and the main sensor MS from an associated normal operation-related circuit, for example, the PID controller 140 of the feedback controller 140, and connects them only to the sensor resistance measurement unit 160, thereby reduces or eliminates measurement errors.

Referring to FIG. 10, the circuit switching unit 200 may be operated by the detection control signal S1 that may be generated by the feedback controller 140, wherein the circuit switching unit 200 may include a circuit-changing component such as one or more mechanical and/or semiconductor relay apparatuses. This circuit switching unit 200 selectively connects the main sensor MS to the PID controller 141 or the sensor resistance measurement unit 160 to allow a normal process or a test process to proceed.

FIG. 10 shows that the thermal actuator TA is directly connected to the power controller 120, and the circuit switching unit 200 and a heater resistance measurement unit 150 are symbolically indicated by a dashed box in the middle of a connection path, and these switching unit 200 and heater resistance measurement unit 150 may also be, like the main sensor MS, selectively connected to the power controller 120 or a resistance measurement unit 150 by the circuit switching unit 200, which may be further understood through description of FIGS. 3 and 4.

In FIG. 10, a TC sensor AS is an auxiliary sensor that detects the temperature of the thermal medium 110 separately from the main sensor MS, generates a monitoring temperature signal to monitor errors, malfunctions, etc. of the main sensor MS, and transmits the monitoring temperature signal to a thermal medium temperature measurement unit 170.

Power supply with respect to the thermal actuator TA is carried out by the power controller 120, for example, using a PWM method, and a power control signal S2 for controlling the amount of power supplied may be generated by the feedback controller 140, etc. At this time, detection of supply power for a thermal source TS is carried out by the supply power detector 180, and in the present embodiment, power control involves counting the number of pulses of a control signal and multiplying this number by a preset power value per pulse to calculate the total power set to be supplied to the thermal source TS, which is described again with reference to FIGS. 12 and 13.

As described above, the detection control signal S1 is to separate, on the time axis, a normal process operation of each device or elements from a signal detection operation for detecting a characteristic value (characteristic variable, such as voltage, resistance, etc.) of each device or element. During a process, the detection control signal S1 for real-time measurement is separated into process time and detection time. During periodic PM, the value may be measured by using a separate detection and control method.

Switching of a circuit is to reduce or eliminate measurement errors. However, without circuit switching, that is, without time-division operation separation described with reference to FIG. 5, a real-time process operation and a detection operation may be processed in parallel, and the detection operation may be performed periodically, aperiodically, or intermittently. However, according to an embodiment, when the process operation and detection (measurement) operation are carried out as described above, the process operation and the detection operation may be carried out alternately in a time-division manner.

When the internal resistance of the main sensor is measured, the sensor resistance may be measured by applying a voltage-dividing circuit by using a constant voltage.

Figure 11:
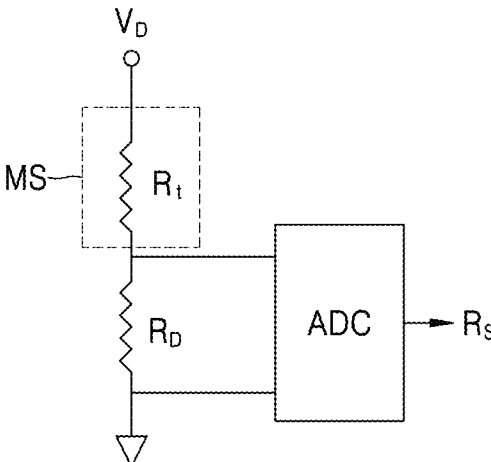
FIG. 11 is a schematic resistance detection circuit diagram showing a resistance measurement method, from a sensor, which may be applied to embodiments.

FIG. 11 illustrates an example of a method of measuring the resistance from a sensor. This method involves connecting a resistance $R_t$ of a sensor, which is a general target to be measured, in series with a resistance $R_d$ of a detection element having a preset reference resistance, detecting a voltage which is induced across the detection element while a constant voltage $V_d$ of a preset potential is supplied to this series circuit, and outputting, as a resistance $R_s$ of an actual main sensor, a resistance value corresponding to the detected voltage through an AD (analog to digital) converter. This circuit may be included in the sensor resistance measurement unit 160.

Hereinafter, control of power supplied to a thermal actuator includes an on-off control method, a constant voltage control method, a continuous control method, a constant power control method, and a phase control method, and these are applicable to the control system of the disclosure.

Hereinafter, a method of calculating applied power in thermal control, that is, a heating/cooling process, is described.

Figure 12:
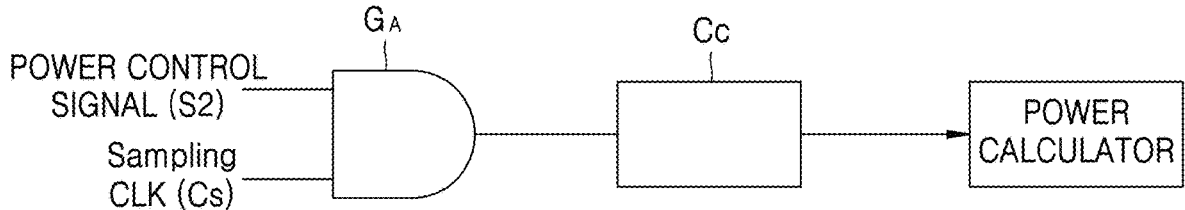
FIG. 12 is a logic circuit for calculating the amount of power, which may be applied to embodiments.
Figure 13:
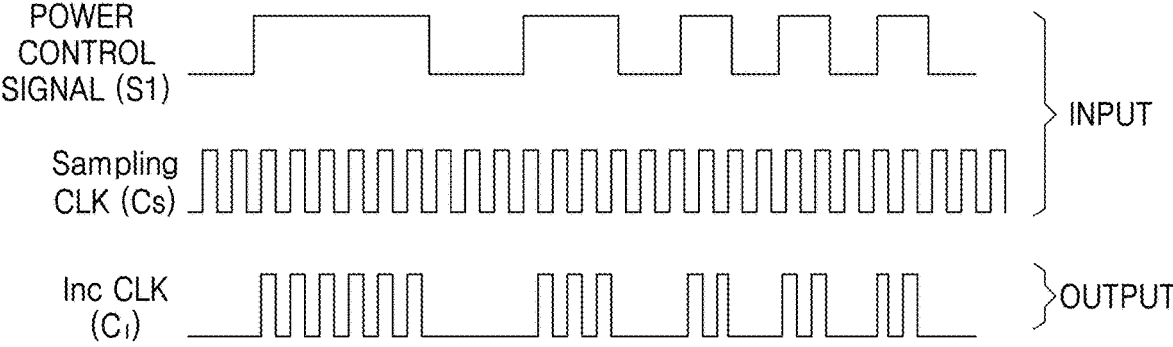
FIG. 13 illustrates an input signal for the logic circuit of FIG. 12 and a corresponding output pulse.

FIG. 12 illustrates a logic circuit that accumulates power application time with an AND gate $G_A$ and a clock counter Cc, and FIG. 13 illustrates an input signal in FIG. 12 and a corresponding output pulse.

Referring to FIGS. 12 and 13, a sampling clock (CLK) Cs and a PWM power control signal S1 are input to the AND gate $G_A$ having at least two input ports, and a pulse (Inc CLK) of a high signal is output from the AND gate $G_A$ for the length (time) of the high signal of a control signal. This output is counted by a counter Ci, and a corresponding count value is output.

For example, in a case where a temperature sampling control period is 40 mS and a sampling CLK is 10 mS, when the power control signal S1 is high, power is supplied to a thermal actuator. When the pulse of output (Inc CLK) of the AND gate is counted by the counter, a resulting value is, for example, 15. Therefore, the total power supply for a thermal actuator is 15×10 mS=150 ms, that is, 0.15 seconds. In this regard, when the frequency of the sampling clock Cs is increased, an amount of power P precisely applied with a small error in a heating/cooling system may be calculated.

The calculation of the amount of power P applied to the thermal actuator uses power supplied to an actual thermal actuator and a detected resistance value of the thermal actuator. Changes in resistance of a main sensor may occur suddenly and rapidly, and aging that occurs slowly due to heat may be identified by comparing the amount of power (or the amount of heat), which is applied during a process time, with a resistance value of the main sensor.

The resistance value of the sensor is detected independently while the thermal actuator and sensor is separated from existing circuits during measurement as described above.

In an embodiment, a TC element is applied as an auxiliary temperature detection sensor. RTD sensors, which are main sensors, measure temperature through changes in resistance according to the temperature of a thermal medium, whereas TC elements measure temperature by using electromotive force and thus are applied to determine temperature detection errors according to aging of RTD sensors, which are main sensors.

Hereinafter, according to an embodiment, an algorithm of a temperature control system in a heating apparatus is described.

In the temperature control system, in order to reach a set temperature, a difference between values of the set temperature and temperature fed back from a sensor is applied to a PID temperature control algorithm to adjust the amount of power supplied to a resistant heater. Auto-tuning is carried out when initial characteristics of the system are unknown, and thus allows basic stable PID values of the system to be found.

In this regard, when the maximum of the amount of power is 100 due to a limitation being placed on the maximum amount of power suitable depending on a system, the amount of power may be adjusted within a range of a certain lower limit below 99 to apply power to a heater. When there is a temperature difference ($\Delta T$) between an object to be heated, for example, a heating plate, and a process specimen, for example, a wafer, an offset variable is used. In addition, the heating rate of a system may be adjusted by applying a temperature rise rate per minute ($\Delta T/min$).

The temperature of the object to be heated and the temperature of the process specimen may be different. First, when the temperature of the object to be heated stabilizes and the object to be heated reaches a normal state, a difference between the temperature of the process specimen and the temperature of the object to be heated is eliminated by adjusting an offset. When a system occurs a temperature defect warning due to temperature changes caused by external factors at a steady-state of normally raising and maintaining the temperature of the heated object, this may be solved by adding a function to prevent defects caused by external variables (airflow changes, sealing abnormalities, etc.). In a current heating/cooling control system, internal variables directly responsible for raising and maintaining the temperature of the heated object include the resistance of a heater and a sensor and power to be applied to the heater. Changes in these characteristic variables may cause system malfunction.

As described above, defects may ultimately appear as defects in a process specimen and defects in control by a controller. The defects related thereto include a temperature overshoot, temperature hunting, a temperature failure of a temperature monitoring sensor. These defects cause the controller to issue a defect message, warn or stop the operation of a corresponding control system, allow determination of causes of defects and repairing the same.

PID auto-tuning often uses a transient response method and is performed at the beginning of production operation or after system repair, and may not be performed during a process.

In the present embodiment, as important variables of a temperature controller, the following initial variables may store important variables during an initial stable process and are utilized to compensate for each function.

Set temperature (SV)

Set temperature (SV_INT_OP) at the beginning of process

Offset (Offset_INT_OP) between temperature of object to be heated and temperature of process specimen at the beginning of process Offset (Offset) between temperature of object to be heated and temperature of process specimen Current temperature ($PV_{RTD}$) measured by RTD sensor Maximum (total) amount of applied power (TP)

Compensation value (Bias_Offset) for difference between temperature of object to be heated and temperature of process specimen $\Delta T/min$ (temperature rise rate)

Temperature ($PV_{TC}$) measured by TC sensor

Total amount of power (TP) applied during process cycle

Amount of change in resistance (ΔR_S) of resistant sensor at process temperature Amount of change in resistance (ΔR_H) of resistant heater at process temperature Amount of change in voltage (ΔV) applied to heater Set temperature (SV$_{\_INT}$) at the beginning of stable process Current temperature (PV$_{RTD\_INT}$) measured by RTD sensor at the beginning of stable process Maximum amount of power applied (MP$_{\_LIMIT\_INT}$) at the beginning of stable process Value of difference (Offset_INT) between temperature of object to be heated and temperature of process specimen at the beginning of stable process Temperature rise rate per minute (ΔT/min) of object to be heated at the beginning of stable process Current temperature (PV_TC) measured by TC sensor at the beginning of stable process Power and resistance-related power value (P_INT_OP) at the beginning of stable process Total amount of power (TP_INT_OP) applied during process cycle at the beginning of stable process RTD resistance value (R_RTD_INT_SV) at SV temperature at the beginning of stable process Changed RTD resistance value (R_RTD_diff_SV) at set temperature (SV)

Figure 14:
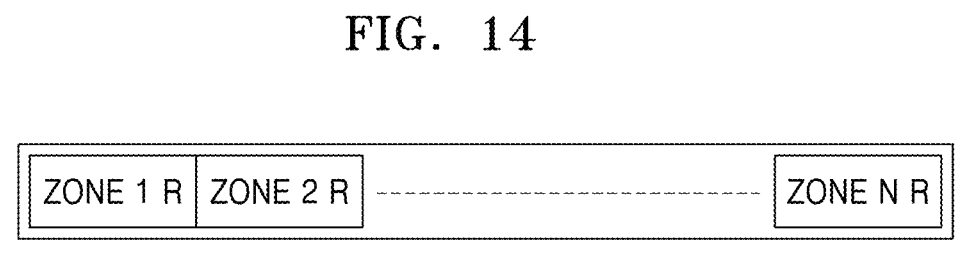

Heater resistance value (R_H_INT) at process temperature at the beginning of stable process Value of voltage (V_INT) applied to heater at the beginning of stable process P parameter (KP_PID_INT) in PID control at the beginning of stable process I parameter (TI_PID_INT) in PID control at the beginning of stable process D parameter (TD_PID_INT) in PID control at the beginning of stable process L value (L_INT_OP) in transient response method of auto-tuning at the beginning of stable process T value (T_INT_OP) in transient response method of auto-tuning at the beginning of stable process Value of amount of heat (Q_INT_OP) applied to heater in one process cycle at the beginning of stable process Calculated value (mc_INT_OP) obtained by mass of object to be heated x specific heat value at the beginning of stable process As shown in FIG. 14, when there are several (multi-zone) heaters within one object to be heated, each heater resistance detector is utilized to adjust a heating value of each zone, such that a heating rise temperature difference caused by a resistance difference between each zone may be reduced.

If ZONE 2 R is reference resistance of an object to be heated in a heating/cooling temperature control system, ΔRN=ZONE NR−ZONE 2 R is calculated from ΔR1=ZONE 1 R−ZONE 2 R, and then a max power limit value of heaters in each zone is adjusted. The value of Max Power Limit 2 is set to 90%, which is the middle of a value of ±10% from 100%, and a max power limit value is adjusted from Max Power Limit 1∝90+ (ΔR1/ZONE 2 R) to Max Power Limit N∝90+ (ΔRN/ZONE 2 R). A reference max power limit range is set within an appropriate range of a system's heating capacity.

When a temperature control system encounters a difference or the amount of change in the middle of a process, compensation is carried out in the following manner.

1) Occurrence of Difference Between PV$_{RTD}$ and PV$_{TC}$

Assuming that the set temperature, SV, is 300° C., PV$_{RTD}$ is 300° C., and if PV$_{TC}$<PV$_{RTD}$, the resistance of an RTD sensor of an object to be heated increases, and thus the actual temperature of the object to be heated decreases as the resistance increases. At this time, Offset=PV$_{RTD}$−PV$_{TC}$, and a process set temperature, SV, applied to an actual process is calculated as follows.

$$SV = SV\_INT\_OP + Offset\_INT\_OP + Offset$$

In the case of PV$_{TC}$>PVRTD, a control algorithm is performed by applying the same expression as in the case of PVTC<PVRTD.

2) In a Case where there is a Difference Between R_RTD_Diff_SV and RTD_R_SV

An initial value of R_RTD_diff_SV is R_RTD_INT_SV.

The process set temperature SV is calculated as follows.

$$SV = SV\_INT\_OP + Offset\_INT\_OP + Offset$$

In this regard, the amount of change in resistance ΔR of an RTD sensor and a temperature difference (offset) are calculated as follows.

$$\Delta R = R\_RTD\_diff\_SV\text{-}R\_RTD\_SV$$

$$Offset = \Delta T \propto V^2/(\Delta R\ mc\_INT\_OP)$$

After calculating the offset, a compensated (changed) resistance value R_RTD_diff_SV of a changed RTD sensor is calculated as follows.

A control algorithm is performed by applying R_RTD_diff_SV=RTD_R_diff_SV+ΔR.

3) In a Case where there is a Difference Between H_R_INT and H_R (Heater Resistance During a Process)

Adjust PID values.

When the resistance R_H during the process is greater than the resistance H_R_INT of a heater at the beginning of the process, a resistance difference ΔR is calculated as follows.

$$\Delta R = R\_H\text{-}R\_H\_INT$$

$$\Delta P = V^2/\Delta R$$

Therefore, the amount of power reduced is ΔP.

Therefore, as seen in the transient response method of PID auto-tuning, it may be confirmed that PID values are changed by L and T values. L is increased by L_INT_OP*P/(P−ΔP) and T is increased by T_INT_OP*P/(P−ΔP), turning into a relatively slow system, and thus Kp, Ti, and Td values become smaller than their values at the beginning of the process and thus are automatically compensated into a fast initial process system. In contrast, Kp, Ti, and Td values become larger than their values at the beginning of the process, turning into a slow system, and thus are automatically compensated into an initially stable process system.

4) In a Case where there is a Change in Voltage Applied to a Heater

In this regard, the heating value is $P=V^2/R$. When the process voltage V satisfies $V>V\_INT$, $\Delta P=(V\_INT/R)^2-(V/R)^2$, and as the heating value increases as much as $\Delta P$, it may be confirmed that PID values are changed by L and T values as seen in the transient response method of PID auto-tuning. L is increased by $L\_INT\_OP*P/(P-\Delta P)$ and T is increased by $T\_INT\_OP*P/(P-\Delta P)$, turning into a relatively slow system, and thus values of proportional band (Kp), integration time (Ti), and derivative time (Td), which are parameters, become larger than their values at the beginning of the process and thus are automatically compensated into an initial process system. In contrast, Kp, Ti, and Td values become smaller than their values at the beginning of the process, turning into a fast system, and thus are automatically compensated into an initially stable process system.

To sum up, the process power P applied to $\Delta V^2/\Delta R$ heater resistance is expressed by the following equation.

$$P = P\_INT\_OP + \Delta V^2/\Delta R$$

where,

P_INT_OP refers to a power value at the beginning of the process.

$\Delta V$ refers to the amount of change in voltage applied to the heater.

$\Delta R$ refers to the amount of change in resistance of the heater.

In this regard, the total power change amount $\Delta P$ that changes in the heater is $\Delta V^2/\Delta R$.

As described above, $\Delta P$ is proportional to the variables L and T in the auto-tuning, transient response method, which determines PID at the beginning of a normal process, and PID values may be determined by using these L and T values.

Figure 15:
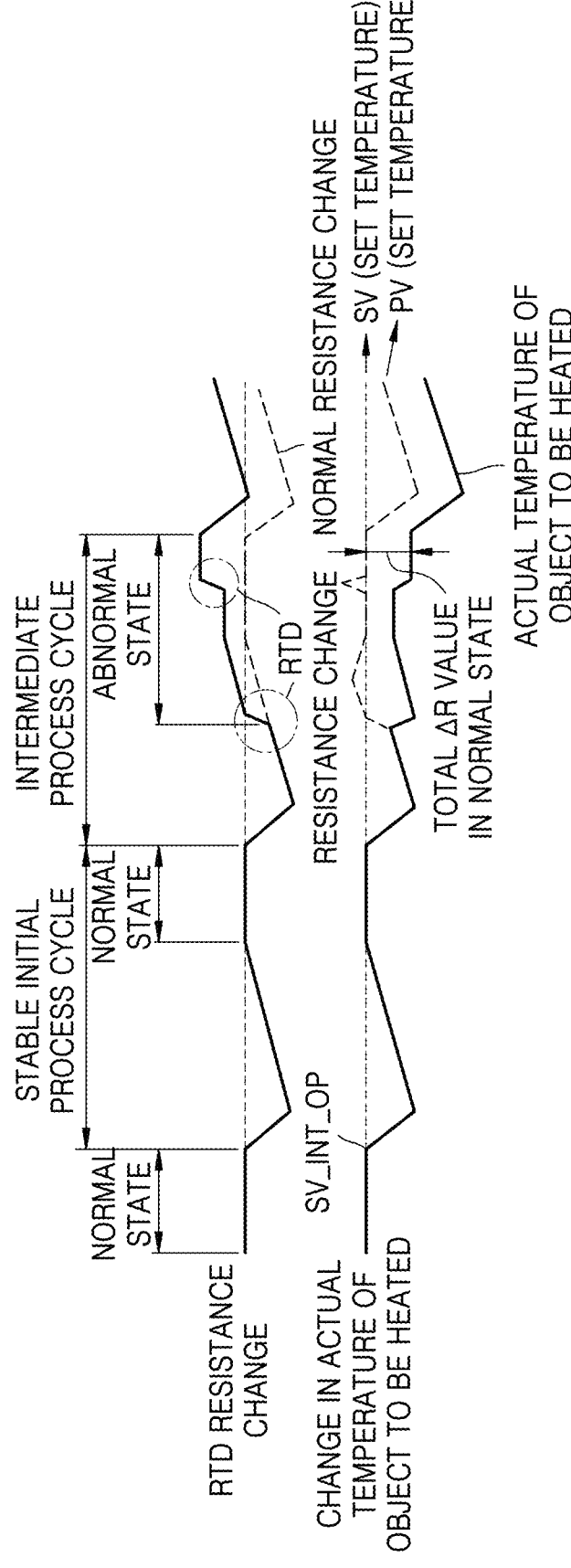
FIG. 15 is a timing chart showing changes in set temperature and actual temperature, illustrating changes in characteristic resistance of a thermal actuator and resulting abnormal temperature control.
Figure 16:
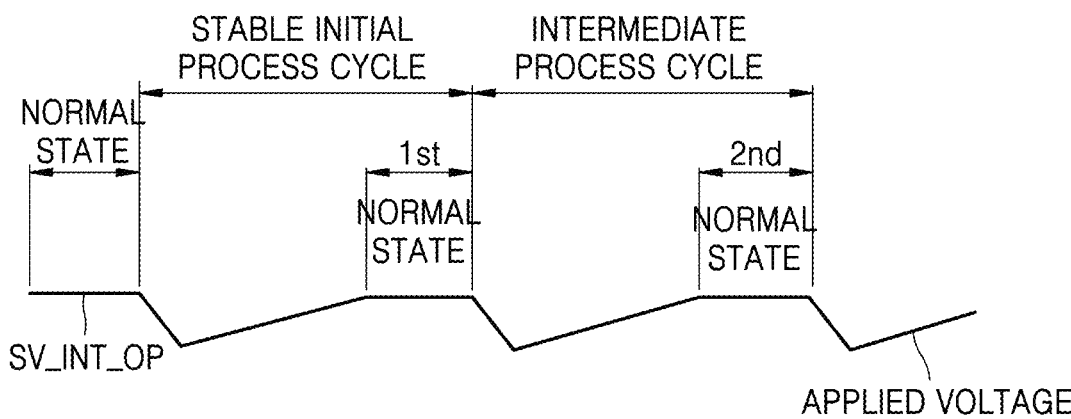
FIG. 16 is a timing chart showing changes in normal set temperature and actual temperature by a temperature control method and system according to the disclosure, in consideration of changes in characteristic variables.

FIG. 15 shows abnormal temperature control due to aging of and age-related changes in a temperature sensor, and FIG. 16 shows detection of changes in characteristics of a temperature sensor and an initial normal temperature change of an object to be heated, which is reflected in temperature control.

It is challenging to identify resistance changes due to aging of an RTD temperature sensor because the resistance changes depending on temperature. However, the changes may be identified by comparing with a TC value, comparing a resistance value and a detected value within a first stable process cycle within a process cycle, and comparing with the amount of applied power. A temperature offset value corresponding to the value of resistance change $\Delta R$ is added/subtracted from SV temperature to respond changes. In existing systems, even when changes occur due to aging of sensor resistance, a controller always maintains and displays a set temperature in a normal state. However, in the normal state, an actual temperature of an object to be heated becomes lower or higher by the resistance change $\Delta R$, which may cause controller temperature or product process defects. A process temperature change process and a normal-state resistance change are detected, and the total change value is obtained and thus compensated into the temperature of an RTD resistance value corresponding to the set temperature (SV) at the beginning of a stable process.

In the error prediction and diagnosis and repair method in the heating/cooling temperature system according to the disclosure, the following five functions are added to the temperature control system compared to existing systems.

1) Detect total amount of power applied within one process cycle
2) Detect TC temperature for comparative temperature
3) Detect resistance change value (RTD_$\Delta R$) resulting from aging of RTD sensor
4) Detect resistance change value ($\Delta R$) resulting from aging of heater
5) Detect value of change in voltage ($\Delta V$) applied to heater Due to addition of the above five functions, three issues below occur in a heating/cooling temperature system.

1) Controller's temperature-control failure
2) Defects in process products
3) External factor defects It is possible to accurately predict and identify defects. In existing systems, identifying the causes of defects is limited. In many cases, the above five functions can accurately categorize, identify, and diagnose the cause of failure of variables such as temperature sensors, heating elements, and other external airflow. And therefore, it is possible to reduce the time needed to sort and repair defective components in a system.

By obtaining resistance measurements suitable for the initial process and measuring the rate of change thereafter in real time or periodically, the system automatically calibrates to the initial process conditions and maintains the same heating/cooling temperature conditions to maintain production quality continuously, and increases facility uptime by extending the PM (Preventive Maintenance) cycle due to poor temperature control, contributing to increased production. In addition, anyone who is not a process and system experts, can predict defects, which are caused by resistance changes, in real time or periodically and prevent occurrence of defects in process products. In addition, when there are several heater zones (multi-zone) for precise heating or cooling temperature of one object to be heated, the temperature difference between each zone may be reduced by adjusting heating energy compared to heater resistance difference between each zone. Moreover, when detection information (DATA) obtained from a more advanced system than a currently applied system is added and utilized, it will be possible to implement a more precise heating and/or cooling system by applying a model to which machine learning, deep learning techniques, etc. are applied.

To summarize the effects, it is possible to predict changes in the self-resistance of a power source, a heating/cooling resistance heating element, and a sensor, identify the cause of defects, calibrate and maintain the system to the initial condition of the heating/cooling temperature in response to real-time/periodic resistance changes, operate the system for a long period of time, maintain constant product quality, and obtain effective control data by applying a model by machine learning to reduce the temperature deviation between multiple heating/cooling zones in one heating element.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A temperature control system for an object of which temperature is to be controlled, the temperature control system comprising:

a thermal medium on which the object of which temperature is to be controlled, which is an object to be heated and/or cooled, is mounted;

one or more thermal actuators installed on the thermal medium to heat and/or cool the object of which temperature is to be controlled;

a power controller configured to supply controlled power to the one or more thermal actuators;

one or more main sensors configured to detect temperature of the thermal medium;

one or more resistance measurement sensors configured to detect characteristic resistance of at least one of the one or more thermal actuators and/or the one or more main sensors;

a circuit switching unit configured to separate, in a test process for measuring the characteristic resistance of the at least one of the one or more thermal actuators and/or the one or more main sensors by using the one or more resistance measurement sensors, the one or more thermal actuators, and/or the one or more main sensors from a circuit for normal operation and circuitously connect the one or more thermal actuators and/or the one or more main sensors to the one or more resistance measurement sensors; and a feedback controller configured to calculate a measurement error or an error of the one or more thermal actuators and/or the one or more main sensors from the temperature obtained from the one or more main sensors and the characteristic resistance obtained by the one or more resistance measurement sensors, and based on the measurement error or the error, generate a power control signal for the power controller.

2. The temperature control system of claim 1, wherein the feedback controller is further configured to compensate for the temperature measured by the one or more main sensors according to an error with respect to a reference value due to a change in the characteristic resistance, and compensate for a reference setpoint of the one or more thermal actuators and/or the one or more main sensors.

3. The temperature control system of claim 1, further comprising:

a thermal source power unit configured to supply power to the power controller; and a power change detector configured to detect, from the thermal source power unit, input power that is applied to the thermal source power unit, wherein the power controller is further configured to detect a power input value from the power change detector and transmit the power input value to the feedback controller, and the feedback controller is further configured to compare the power input value with a reference value and compensate for the power control signal that is applied to the power controller, according to an error between the power input value and the reference value.

4. The temperature control system of claim 3, wherein the power change detector is further configured to count pulses from the feedback controller and multiply the number of pulses obtained by the counting by reference power per pulse to detect the power input value.

5. The temperature control system of claim 1, further comprising one or more auxiliary sensors configured to measure temperature of the one or more thermal actuators, wherein the feedback controller is further configured to compare the temperature detected by the one or more auxiliary sensors with the temperature detected by the one or more main sensor, calculate an error between the temperatures, and based on the error, compensate for the power control signal that is applied to the power controller.

6. The temperature control system of claim 5, wherein the one or more main sensors are each an RTD sensor, and the one or more auxiliary sensors are each a TC sensor with a thermocouple.

7. The temperature control system of claim 1, wherein the feedback controller is further configured to detect the error by applying a machine learning or deep learning-based model.

8. The temperature control system of claim 7, wherein the one or more resistance measurement sensors are further configured to measure the characteristic resistance of the one or more thermal actuators and/or the one or more main sensors in real time during a normal process of the one or more thermal actuators and/or the one or more main sensors.

9. The temperature control system of claim 1, wherein the one or more resistance measurement sensors further are configured to measure the characteristic resistance of the one or more thermal actuators and/or the one or more main sensors in real time during a normal process of the one or more thermal actuators and/or the one or more main sensors.

10. The temperature control system of claim 1, wherein the circuit switching unit comprises one or more mechanical and/or semiconductor relay apparatuses, and the feedback controller is further configured to generate a detection control signal for operating the circuit switching unit according to a process flow.

11. A temperature control method for the temperature control system of claim 1, the method comprising:

performing a power supply operation in which a power controller supplies power to one or more thermal actuators;

performing a thermal control operation in which the one or more thermal actuators thermally heat and/or cool a thermal medium on which an object of which temperature is to be controlled is arranged;

performing a main temperature detection operation in which one or more main sensors detect temperature of the thermal medium;

performing a characteristic resistance detection operation in which one or more resistance measurement sensors detect characteristic resistance of at least one of the one or more thermal actuators and/or the one or more main sensors;

disconnecting, by a circuit switching unit, the one or more thermal actuators and/or the one or more main sensors from a circuit for normal operation during the characteristic resistance detection operation and circuit-connecting the one or more thermal actuators and/or the one or more main sensors to the one or more resistance measurement sensors; and performing a control signal generation operation in which a feedback controller calculates a measurement error or an error of the one or more thermal actuators and/or the one or more main sensors from the temperature obtained from the one or more main sensors and the characteristic resistance obtained by the one or more resistance measurement sensors, and based on the measurement error or the error, generates a power control signal for the power controller.

12. The temperature control method of claim 11, wherein the feedback controller compensates for the temperature measured by the one or more main sensors according to an error with respect to a reference value due to a change in the characteristic resistance, and compensates for a reference setpoint of the one or more thermal actuators and/or the one or more main sensors.

13. The temperature control method of claim 11, further comprising:

supplying by a thermal source power unit, power to the power controller; and detecting, by a power change detector from the thermal source power unit, input power that is applied to the thermal source power unit, and transmitting the input power to the feedback controller, wherein the feedback controller compares a value of the input power with a reference value and compensates for the power control signal that is applied to the power controller, according to an error between the value of the input power and the reference value.

14. The temperature control method of claim 13, further comprising counting, by the power change detector, pulses from the feedback controller and multiplying the number of pulses obtained by the counting by reference power per pulse to detect the value of the input power.

15. The temperature control method of claim 11, further comprising performing an auxiliary temperature detection operation in which one or more auxiliary sensors measure temperature of the one or more thermal actuators, wherein the feedback controller compares the temperature detected by the one or more auxiliary sensors with the temperature detected by the one or more main sensors, calculates an error between the temperatures, and based on the error, compensates for the power control signal that is applied to the power controller.

16. The temperature control method of claim 15, wherein an RTD sensor is applied during the main temperature detection operation, and the auxiliary temperature detection operation of measuring the temperature of the one or more thermal actuators is performed by using a TC sensor.

17. The temperature control method of claim 11, wherein, during the characteristic resistance detection operation, the one or more resistance measurement sensors measure the characteristic resistance of the one or more thermal actuators and/or the one or more main sensors in real time during a normal process of the one or more thermal actuators and/or the one or more main sensors.

18. The temperature control method of claim 11, wherein the circuit switching unit performs the circuit connection by using one or more mechanical and/or semiconductor relay apparatuses during the characteristic resistance detection operation, and the feedback controller generates a detection control signal for operating the circuit switching unit according to a process flow.

\* \* \* \* \*